United States Patent
Nagasaki et al.

[11] Patent Number: 5,325,190
[45] Date of Patent: Jun. 28, 1994

[54] COLOR FIELD SEQUENTIAL IMAGING APPARATUS HAVING COLOR-MISREGISTRATION CORRECTION FUNCTION BASED ON CORRELATIONS IN UNITS OF COLORS

[75] Inventors: Tatsuo Nagasaki, Yokohama; Takeshi Mori; Yasuhiro Komiya, both of Tokyo, Japan

[73] Assignee: Olympus Optical Co., Ltd., Tokyo, Japan

[21] Appl. No.: 955,313

[22] Filed: Oct. 1, 1992

[30] Foreign Application Priority Data

Oct. 9, 1991 [JP] Japan .................. 3-262350
May 12, 1992 [JP] Japan .................. 4-119182

[51] Int. Cl.⁵ .................. H04N 9/04; H04N 9/093
[52] U.S. Cl. .................. 348/270; 348/263
[58] Field of Search .................. 358/42, 51, 98, 22, 358/17, 18, 105; H04N 9/04, 9/093

[56] References Cited

U.S. PATENT DOCUMENTS

| | | | |
|---|---|---|---|
| 4,851,899 | 7/1989 | Yoshida et al. | 358/42 |
| 4,908,720 | 3/1990 | Nagumo | 358/51 |
| 4,967,264 | 10/1990 | Parulski et al. | 358/42 |
| 5,081,525 | 1/1992 | Akiyama et al. | 358/51 |
| 5,084,761 | 1/1992 | Nitta | 358/42 X |
| 5,113,247 | 5/1992 | Akiyama et al. | 358/51 |
| 5,115,303 | 5/1992 | Hayashi | 358/51 |

FOREIGN PATENT DOCUMENTS 4-317292 11/1992 Japan .................. H04N 9/04

*Primary Examiner*—James J. Groody
*Assistant Examiner*—John W. Miller
*Attorney, Agent, or Firm*—Frishauf, Holtz, Goodman & Woodward

[57] ABSTRACT

A field sequential imaging apparatus includes an imaging unit for imaging an object in units of colors by sequentially switching a plurality of color filters, and a correction unit for correcting color misregistrations on the basis of correlations among image signals from the imaging unit in units of colors.

13 Claims, 26 Drawing Sheets

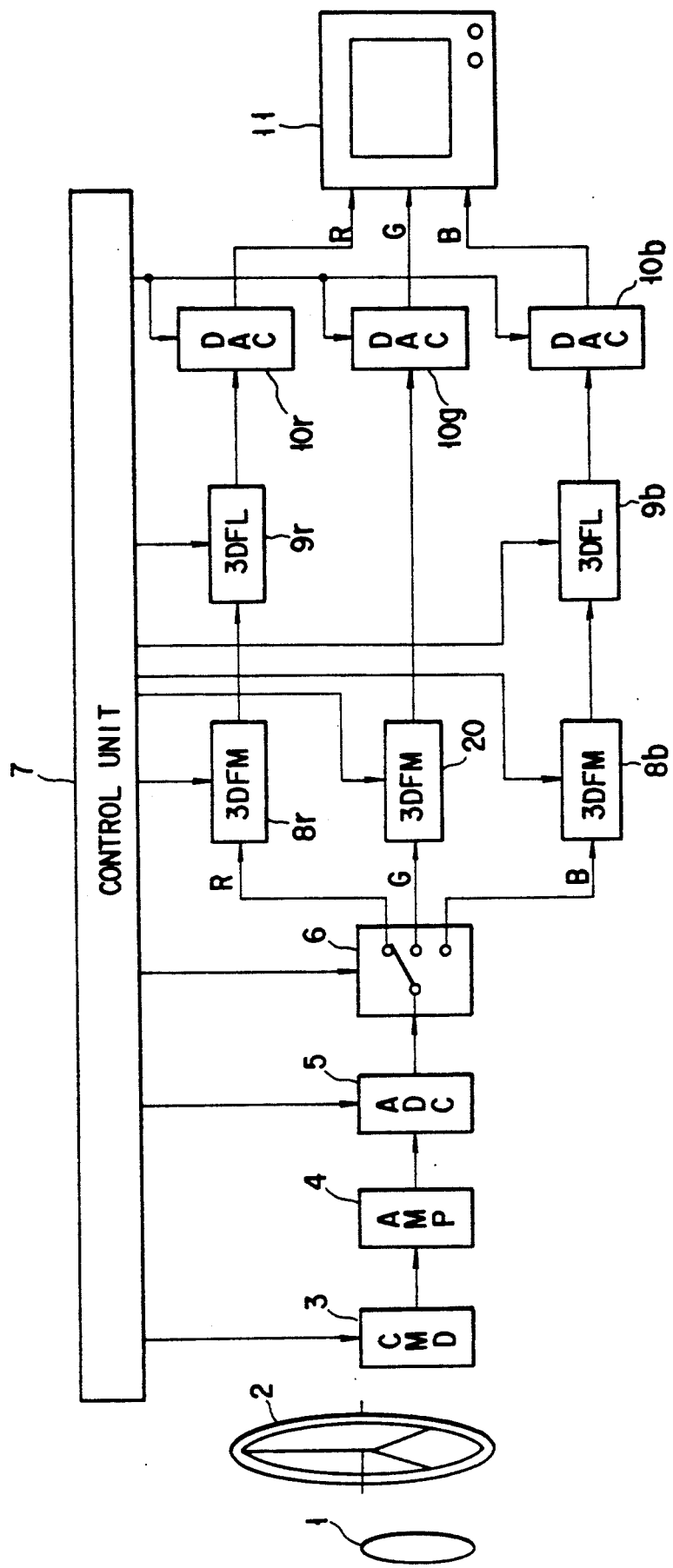
F I G. 1

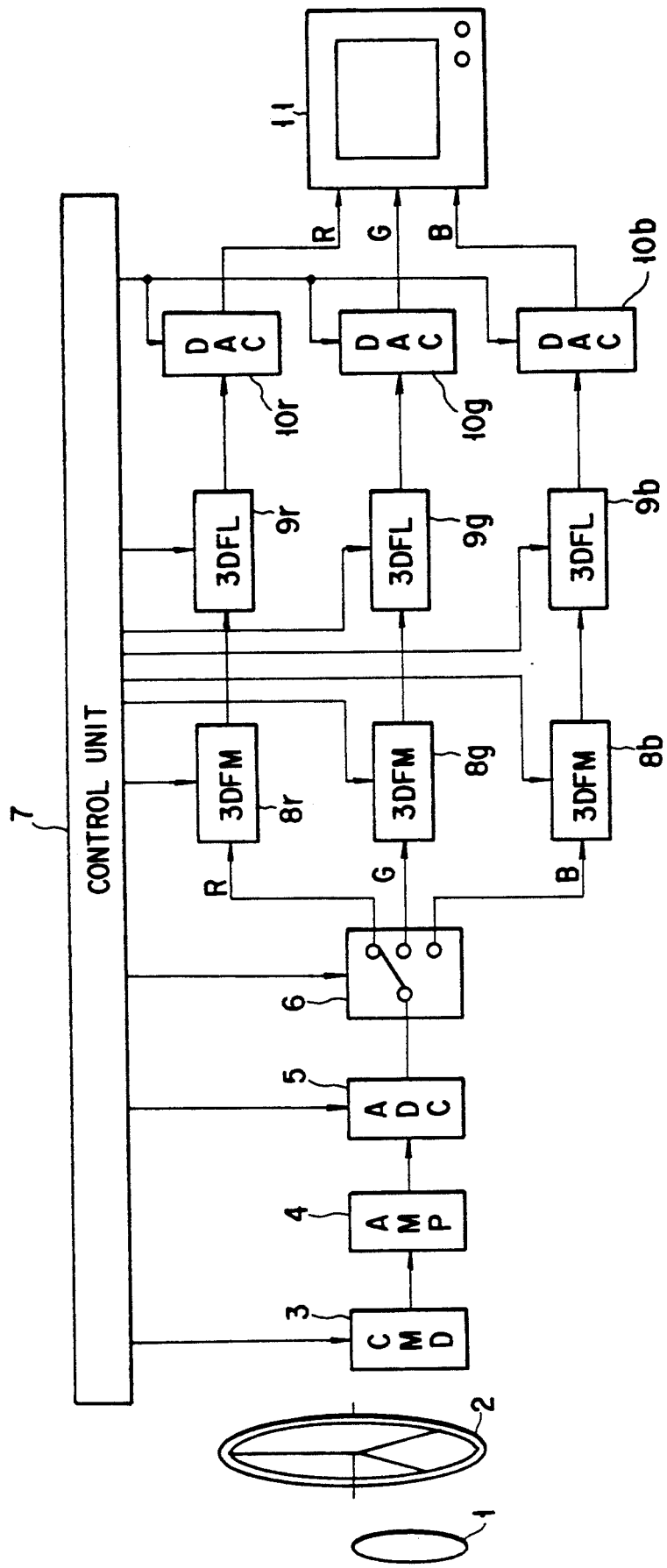
F I G. 7

REFERENCE AREA (INPUT IMAGE = G IMAGE)

SEARCH AREA (IMAGES OTHER THAN INPUT IMAGE = R&B IMAGES)

OVERLAPPING DISPLAY
OF RGB IMAGE

OVERLAPPING DISPLAY
OF OBJECT IMAGE

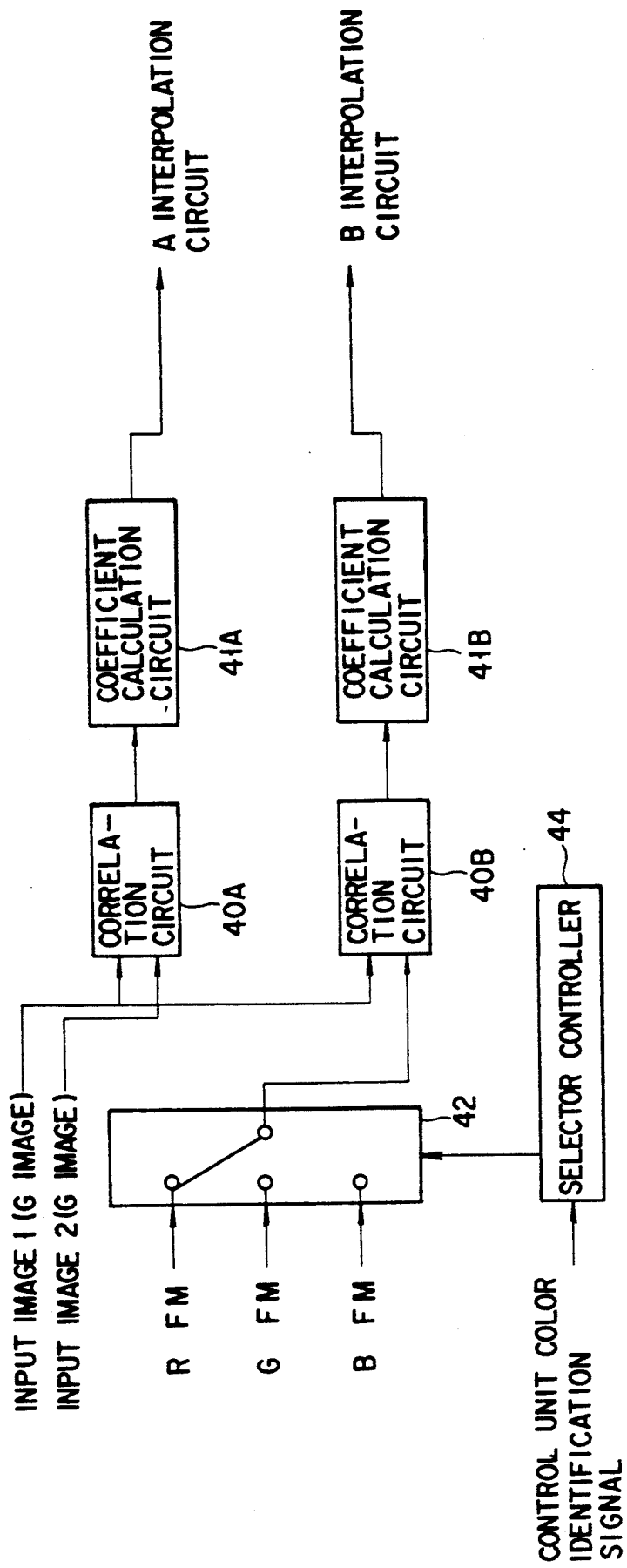
F I G. 26

FIG. 27

| FIELD | 1 | 2 | 3 | 4 | 5 | 6 | 7 | 8 | 9 | TIME |
|---|---|---|---|---|---|---|---|---|---|---|
| INPUT IMAGE | $R_0$ | $G_0$ | $B_0$ | $R_1$ | $G_1$ | $B_1$ | $R_2$ | $G_2$ | $B_2$ | |
| OUTPUT IMAGE R | | $R_0$ | $R_0'$ | $R_0''$ | $R_1$ | $R_1'$ | $R_1''$ | $R_2$ | $R_2'$ | |
| OUTPUT IMAGE G | | | $G_0$ | $G_0'$ | $G_0''$ | $G_1$ | $G_1'$ | $G_1''$ | $G_2$ | |
| OUTPUT IMAGE B | | | | $B_0$ | $B_0'$ | $B_0''$ | $B_1$ | $B_1'$ | $B_1''$ | |
F I G. 28
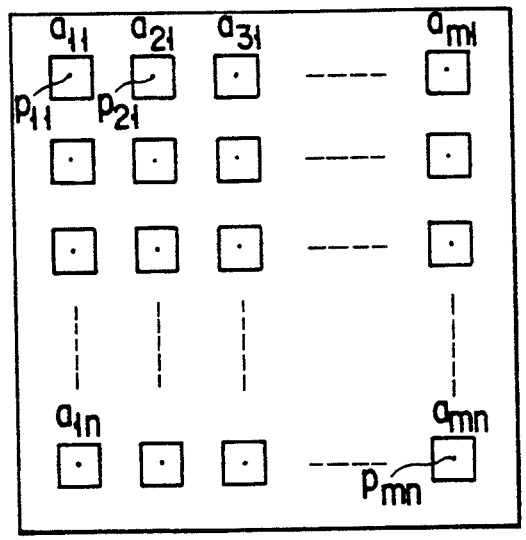
F I G. 29

COLOR FIELD SEQUENTIAL IMAGING APPARATUS HAVING COLOR-MISREGISTRATION CORRECTION FUNCTION BASED ON CORRELATIONS IN UNITS OF COLORS

BACKGROUND OF THE INVENTION

1. Field of the Invention

The present invention relates to a color field sequential imaging apparatus for imaging an image in units of three colors, i.e., red, green, and blue.

2. Description of the Related Art

Such an imaging apparatus is disclosed in, e.g., "Solid-state Imaging Device Beginning to be Used in Endoscope by Utilizing Its Compact Structure", Nikkei Electronics, May 5, 1986 (No. 394) pp. 145-158. In this reference, when a charge transfer type imaging device such as a CCD is used in a conventional color field sequential imaging operation, if field data for one color is read out in 1/90 sec or 1/60 sec, 1/30 sec or 1/20 sec are required to expose three colors, i.e., red, green, and blue (to be abbreviated to as RGB hereinafter).

If 1/20 sec is required to constitute one color image, color misregistrations of RGB colors occur for an object which moves quickly, as shown in FIG. 23A. In a conventional imaging apparatus, the scanning time of field data is shortened to eliminate such color misregistrations. However, sufficient effects have not been obtained.

SUMMARY OF THE INVENTION

It is therefore an object of the present invention to provide a field sequential imaging apparatus, which can achieve high-precision color-misregistration correction with low cost by correcting color misregistrations on the basis of correlations in units of colors.

In order to achieve the above object, the field sequential imaging apparatus of the present invention comprises imaging means for imaging an object in units of colors by sequentially switching a plurality of color filters, and correction means for correcting color misregistrations on the basis of correlations of image signals from the imaging means in units of colors.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a field sequential imaging apparatus according to the first embodiment of the present invention;

FIG. 7 is a block diagram showing an arrangement for realizing another interpolation method;

FIG. 26 is a block diagram showing an arrangement of an interpolation coefficient calculation circuit;

FIG. 27 is a view showing an example of a displayed image;

FIG. 28 is a view showing an example of a displayed image;

FIG. 29 is a view showing a reference area according to the eighth embodiment of the present invention;

DETAILED DESCRIPTION OF THE PREFERRED EMBODIMENTS

The first embodiment of the present invention will be described below with reference to FIG. 1. In the first embodiment, RGB-exposure operations are performed within a period (1/60 sec for NTSC scheme) of a display system so as to reduce color misregistrations. In order to perform the RGB-exposure operations within the period, a device capable of performing a high-speed reading operation is used as an imaging device. As a high-speed imaging means, a charge modulation device (to be referred to as a CMD hereinafter), a multi-line reading CCD, and the like are known.

Figure 5:
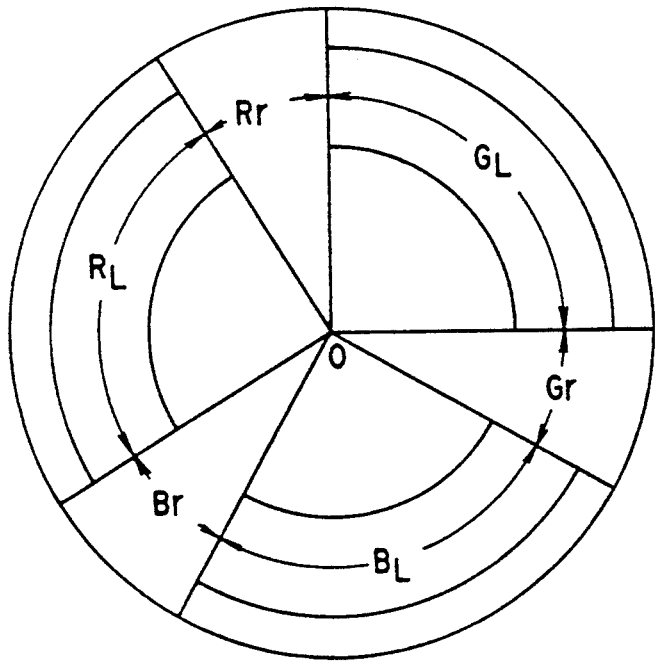
FIG. 5 is a view showing an arrangement of a rotary color filter of the first embodiment.

In the following description, a CMD is used as the high-speed imaging device. A rotary color filter to be used is arranged, as shown in FIG. 5. The rotary color filter is rotated about a point O. In FIG. 5, reference symbols RL, GL, and BL denote exposing portions of the corresponding colors; and Rr, Gr, and Br, light-shielding portions for reading.

Light input through a lens 1 and an R filter portion of a rotary color filter 2 is photoelectrically converted by a CMD 3. An exposure operation is performed during a period corresponding to the portion RL, and when the CMD 3 is shielded by the light-shielding portion Rr of the rotary color filter, the CMD 3 outputs a signal. The output from the CMD 3 is amplified by an amplifier (AMP) 4, and the amplified signal is analog-to-digital (A/D)-converted by an ADC 5. The CMD 3 is controlled by a control unit 7. The output from the ADC 5 is selected by a data selector 6, and is recorded on a three-dimensional field memory (to be abbreviated to as a 3DFM hereinafter) 8r. In this case, the data selector 6 is controlled by the control unit 7. The 3DFM comprises a plurality of field memories, and time-elapsed data can be read out therefrom.

The data from the 3DFM 8r is subjected to interpolation processing by a three-dimensional filter circuit (to be abbreviated to as a 3DFL hereinafter) 9r. The timings of the 3DFM and 3DFL are controlled by the control unit 7. Thereafter, the output from the 3DFL is digital-to-analog (D/A)-converted by a DAC 10r, and the analog data is displayed on a monitor 11.

Figure 11:
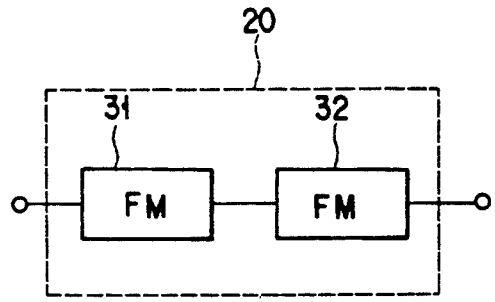
FIG. 11 is a block diagram showing a circuit arrangement of a 3DFM of the third embodiment.

A B component is similarly fetched, and is displayed on the monitor 11. As will be described later, since interpolation processing is performed with reference to a G component, a G signal passes through only a 3DFM 20 so as to adjust the timing. In this embodiment, the 3DFM 20 comprises field memories (to be abbreviated to as FMs hereinafter) 31 and 32, as shown in FIG. 11. Data read out from the 3DFM 20 is D/A-converted, and the analog data is displayed on the monitor 11.

Figure 4:
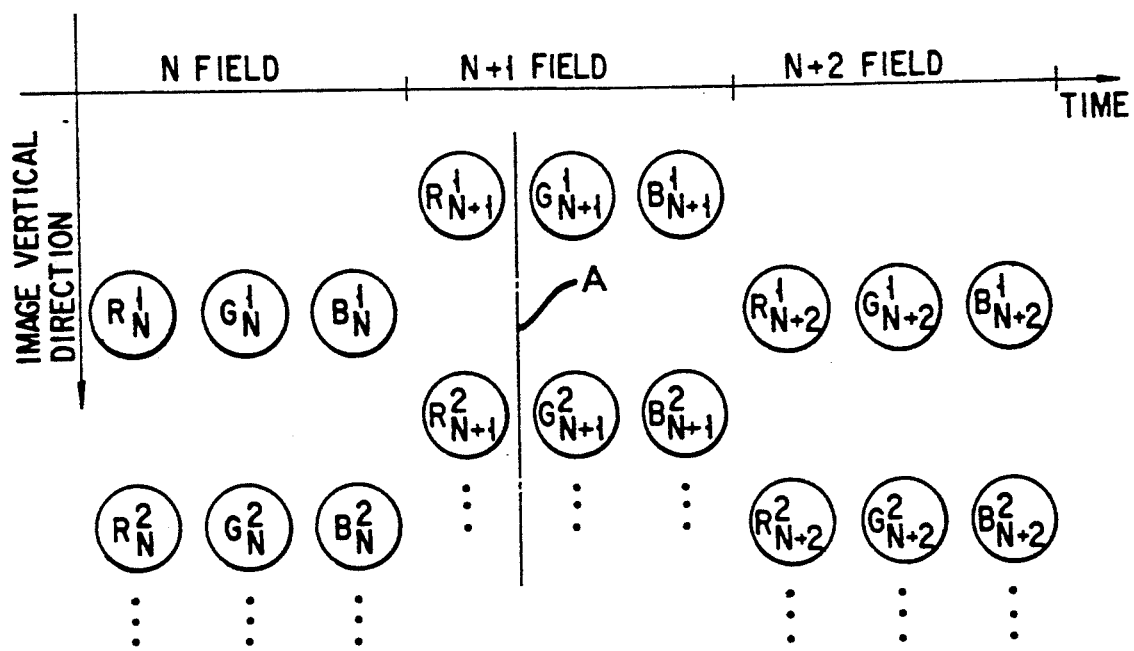
FIG. 4 is a chart for explaining operations of a 3DFM and a 3DFL.

The operations of the 3DFM and 3DFL will be described below with reference to FIG. 4. FIG. 4 illustrates an operation while paying attention to a given pixel and its upper and lower pixels. When image data is read out from the CMD 3 in correspondence with an interlace display system, the relationship between the vertical positions of pixels and time is as shown in FIG. 4.

In this embodiment, a G image including many luminance components is used as an image of interest, and R and B images are time-interpolated at the time position of the G image. When an interpolation method employs a method of calculating a color of interest on the basis of colors before and after the color of interest, an equation therefor is defined as follows. In FIG. 4, R' is interpolated and displayed at the position of $G_{N+1}^2$.

$$R' = 2/3 \times R_{N+1}^2 + \tfrac{1}{3} \times \{\tfrac{1}{2} \times (R_{N+2}^1 + R_{N+2}^2)\} \quad (1)$$

Similarly, B' is interpolated, as indicated by the following equation (2):

$$B' = \tfrac{2}{3} \times B_{N+1}^2 + \tfrac{1}{3} \times \{\tfrac{1}{2} \times (B_N^1 + B_N^2)\} \quad (2)$$

Figure 3:
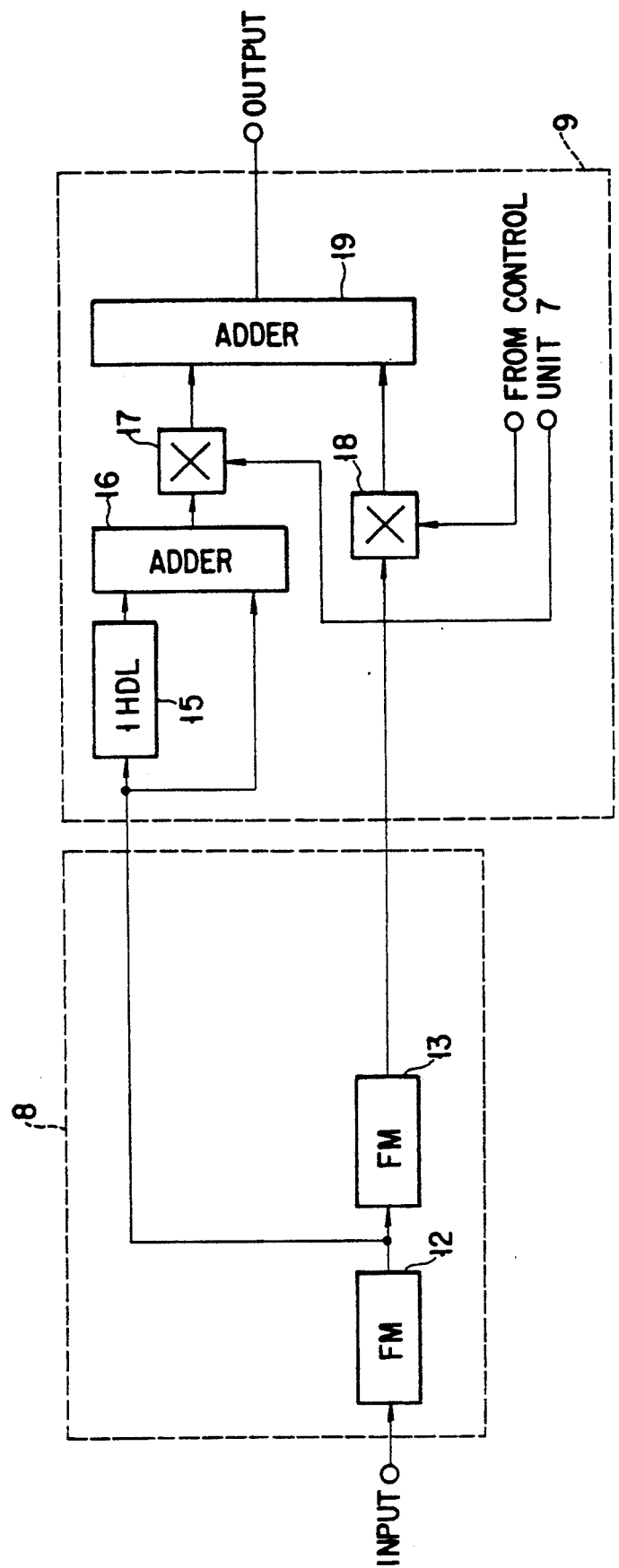
FIG. 3 is a block diagram showing the details of a given circuit portion of FIG. 1.

The above-mentioned R' calculation can be realized by a circuit shown in FIG. 3. In order to obtain immediately preceding and next field image data, FMs 12 and 13 are used. The outputs from these FMs are connected to the 3DFL 9. In the interpolation of a B image, another FM 30 is required in a 3DFM 8b.

In FIG. 3, the output from the FM 12 is supplied to a 1HDL 15 and an adder 16 to calculate $R_{N+2}^1 + R_{N+2}^2$. The output from the adder 16 is connected to a multiplier 17 to calculate $\tfrac{1}{3} \times \{\tfrac{1}{2} \times (R_{N+2}^1 + R_{N+2}^2)\}$ in equation (1). More specifically, the control unit 7 outputs a coefficient "1/6", and the multiplier 17 performs a multiplication.

On the other hand, a multiplier 18 calculates $\tfrac{2}{3} \times R_{N+1}^2$ in equation (1), and outputs the product. More specifically, the control unit 7 outputs a coefficient "$\tfrac{2}{3}$", and the multiplier 18 performs a multiplication. An adder 19 adds the products from the two multipliers, and outputs R'.

Figure 10:
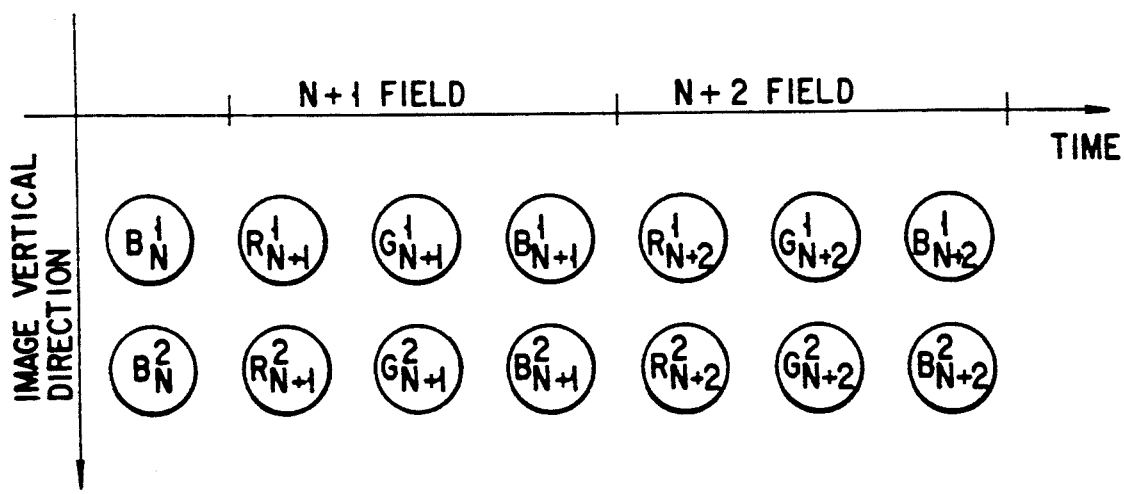
FIG. 10 is a chart showing a state wherein image data is read out in a non-interlace read mode.

In this embodiment, data are read out from the imaging device in correspondence with the interlace system. In a non-interlace system, however, image data are read out, as shown in FIG. 10. R' and B' are interpolated at the time position of $G_{N+1}^1$, as indicated by the following equations (3) and (4):

$$R' = \tfrac{1}{2} \times R_{N+1}^1 + \tfrac{1}{2} R_{N+2}^1 \quad (3)$$

$$B' = \tfrac{1}{2} \times B_{N+1}^1 + \tfrac{1}{2} B_N^1 \quad (4)$$

When image data are displayed through the above-mentioned time-interpolations, color misregistrations can be eliminated. When image data are read out in correspondence with the non-interlace system, frame memories are used in place of field memories.

Figure 2:
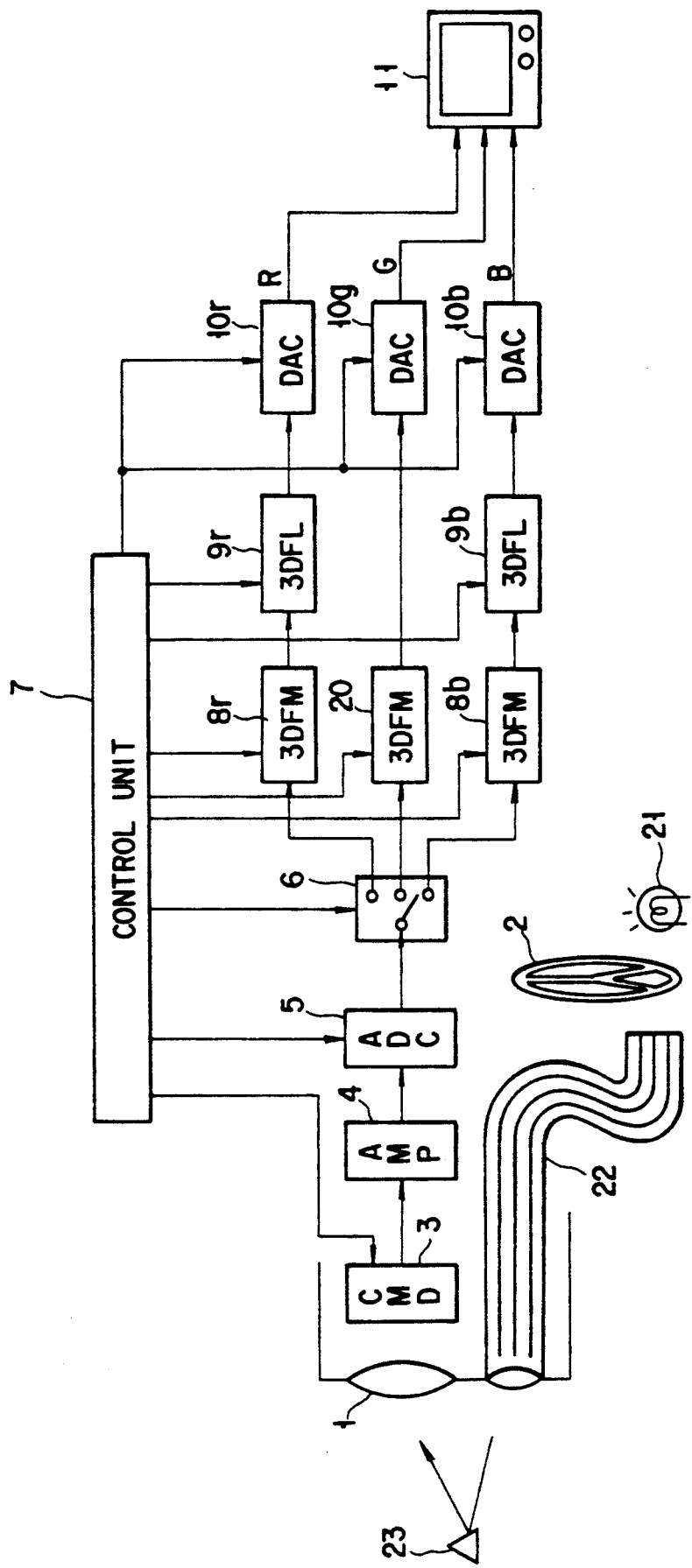
FIG. 2 is a block diagram showing the second embodiment of the present invention applied to an endoscope.

FIG. 2 shows the second embodiment wherein the present invention is applied to an endoscope. When the present invention is applied to an endoscope, a rotary color filter 2 is arranged in front of a light source 21. Light emerging from the rotary color filter 2 is radiated through an optical fiber 22 in an RGB sequential manner, and images reflected by an object 23 are picked up. Since the following circuit operations are the same as those in the first embodiment, a detailed description thereof will be omitted.

In the above embodiments, R and B are interpolated in correspondence with G. Alternatively, G and B may be interpolated and substituted at the position of R, or R and G may be interpolated and substituted at the position of B. In place of interpolating two colors at the position of a given color, three colors may be time-interpolated at a time position where no image signals are present, as indicated by an alternate long and short dashed line vertical A in FIG. 4, and the interpolated colors may be displayed on the monitor. A circuit in this case is arranged, as shown in FIG. 7, and a 3DFM 8 and a 3DFL 9 are inserted in each path of RGB color signals.

Figure 6:
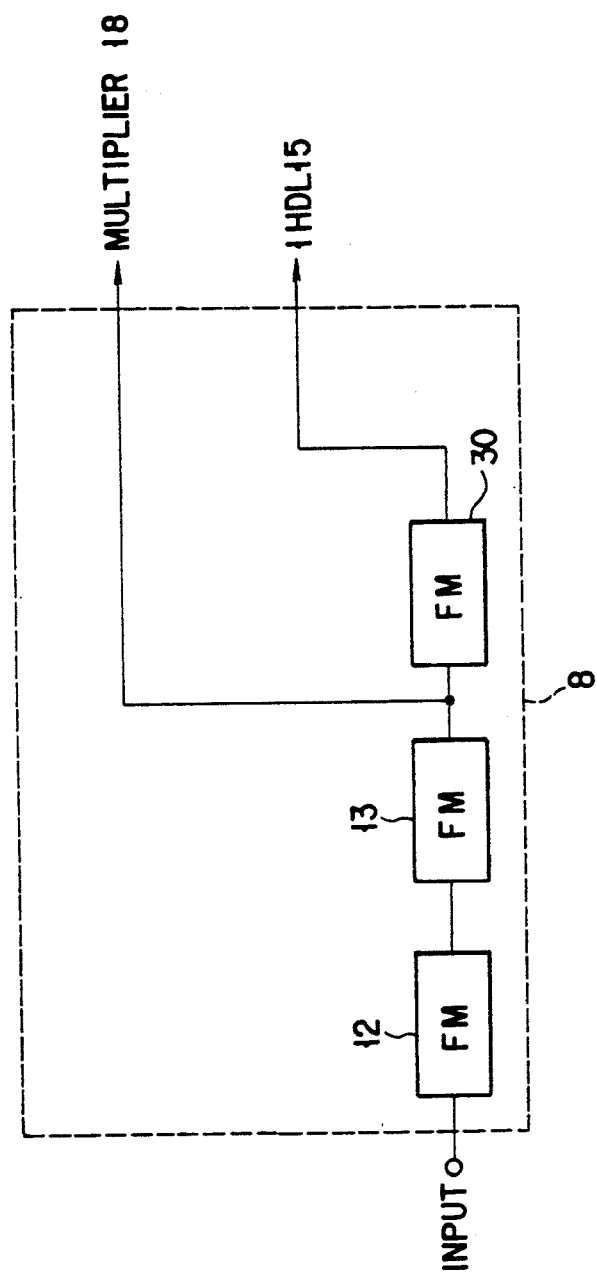
FIG. 6 is a block diagram showing another arrangement of the 3DFM.

The order of color filters is not limited to RGB, but may be arbitrarily changed. For example, when R and B are interpolated at the time position of G, if the order of RBG is employed, an interpolation can be performed using only data in the (N+1)th and (N+2)th fields. For this reason, field memories for two fields need only be prepared, and the FM 30 shown in FIG. 6 can be omitted.

Figure 8:
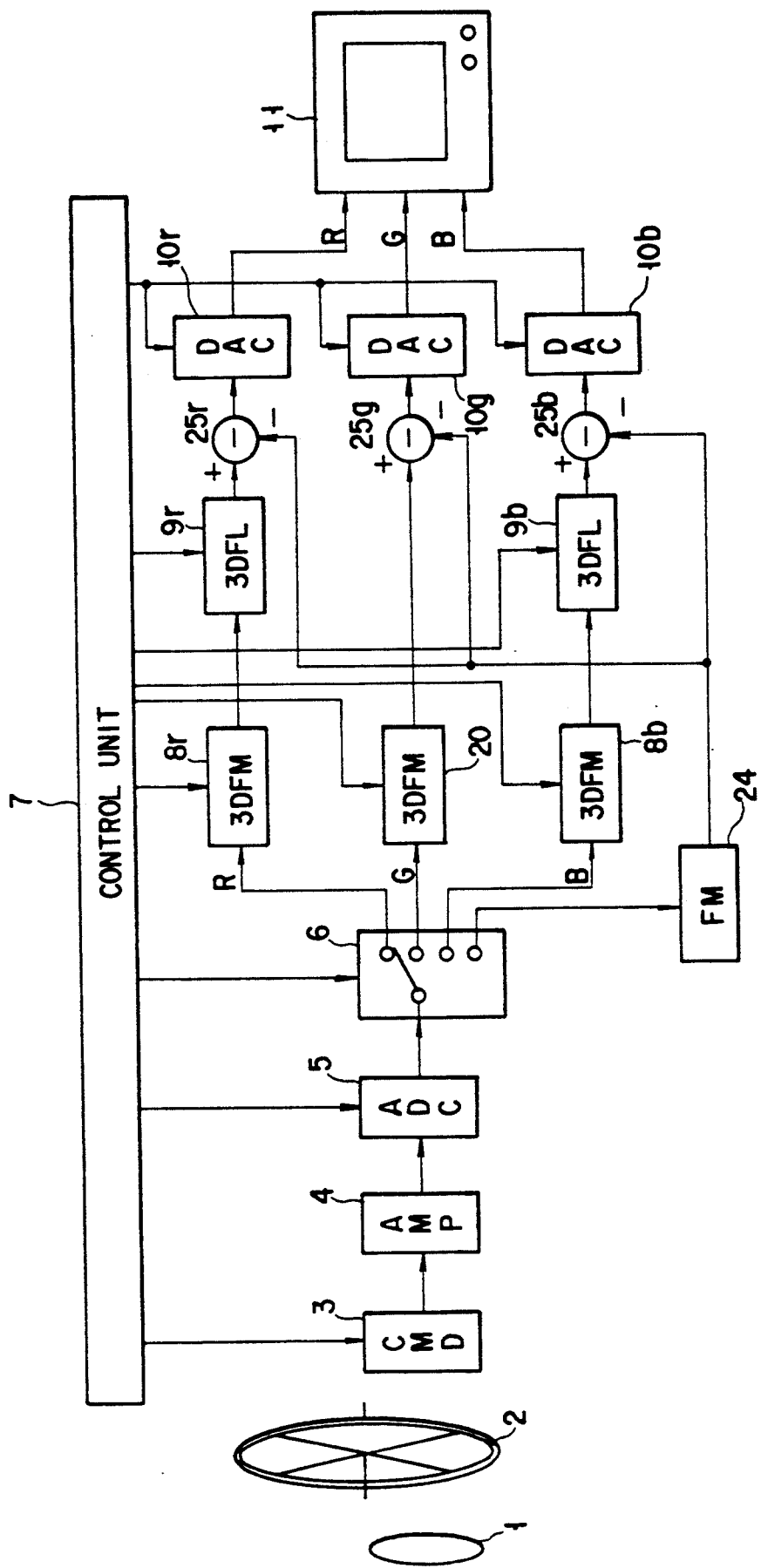
FIG. 8 is a block diagram showing the third embodiment of the present invention that can eliminate read noise.
Figure 9:
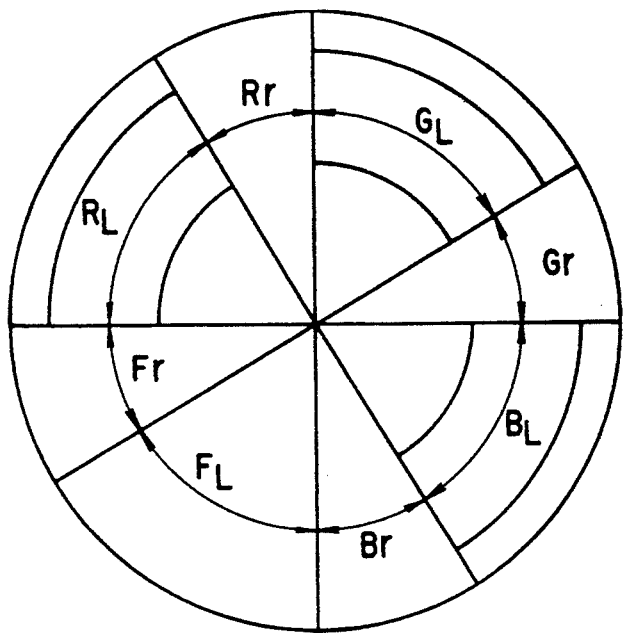
FIG. 9 is a view showing an arrangement of a rotary color filter according to the third embodiment.

FIG. 8 shows the third embodiment for eliminating fixed pattern noise (to be abbreviated to as FPN hereinafter). In this embodiment, a rotary color filter is arranged, as shown in FIG. 9, and operates to read out FPN in a dark state, and to subtract FPN from color signals. In FIG. 9, portions RL, Rr, GL, Gr, BL, and Br are the same as those in FIG. 5, and a detailed description thereof will be omitted. Reference symbol FL denotes a light-shielding portion for storing FPN; and Fr, a portion for reading out FPN.

In this embodiment, storage and reading operations of R, G, B, and FPN components are performed at high speed during one field period. FPN data read out from a CMD is selected by a data selector 6, and is recorded on an FM 24. The FPN data is read out from the FM 24 in correspondence with the read timing of each color, and is subtracted from the corresponding color signal by a corresponding one of subtracters 25r, 25g, and 25b. The reason why the FPN storage time is assured by the portion FL is that the FPN caused by a dark current tends to increase along with the storage time, and the FPN storage time must be set to be equal to that of each color signal.

Figure 12:
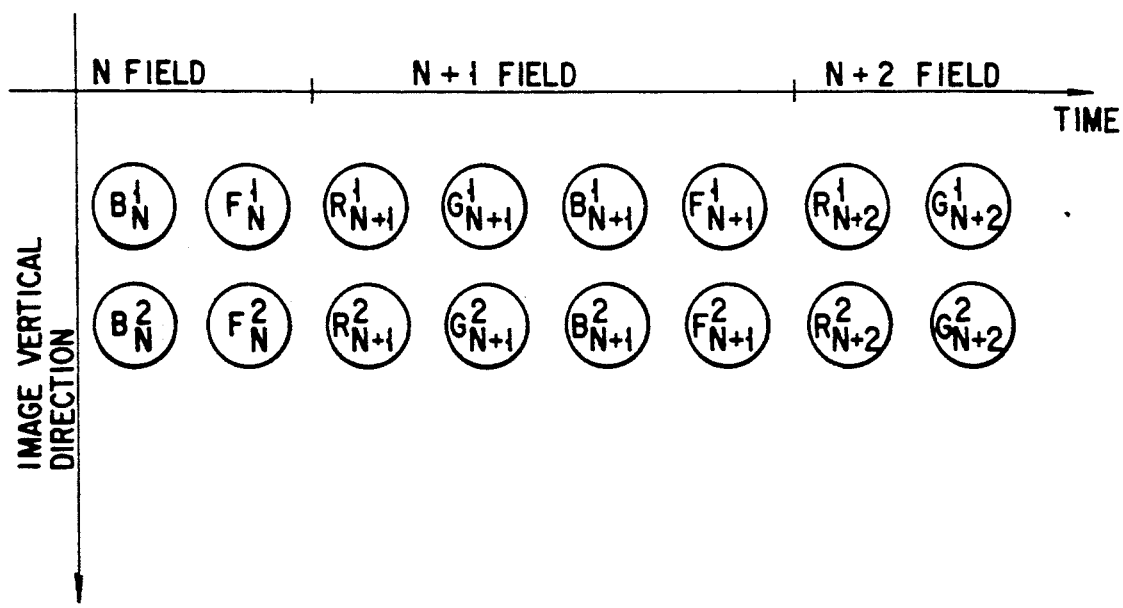
FIG. 12 is a chart showing the relationship between time and position in a non-interlace mode.

Interpolation equations of this embodiment will be described below. In a non-interlace system, since the relationship between time and position is as shown in FIG. 12, interpolation equations of R and B at the time position of $G_{N+1}{}^1$ are expressed by:

$$R' = \tfrac{2}{3} \times R_{N+1}{}^1 + \tfrac{1}{3} R_{N+2}{}^1 \tag{5}$$

$$B' = \tfrac{2}{3} \times B_{N+1}{}^1 + \tfrac{1}{3} B_N{}^1 \tag{6}$$

According to this embodiment, when FPN is subtracted from image signals, the S/N ratio of the image signals can be increased.

A conventional device announced in, e.g., an academic society has been exemplified as the CMD. When such conventional CMD is applied to the present invention, the light-shielding portions are required, as shown in FIG. 5. However, as described in Japanese Patent Application No. 59-124590, when a CMD, which has light-shielding portions in the device, and uses them for transferring data, is used, since signals need not be read out during the light-shielding portions, each light-shielding portion can have a small width. Therefore, an exposure time can be effectively assured.

In the above embodiments, CMD imaging devices capable of performing a high-speed read operation have been exemplified. However, the present invention is also effective when the method of the present invention is executed at an exposure timing of one color per field (one color per frame in a non-interlace system) in place of high-speed rotation. The fourth embodiment will be described below. Since the circuit arrangement of this embodiment is the same as that shown in FIG. 7, only a difference will be described below.

Figure 14:
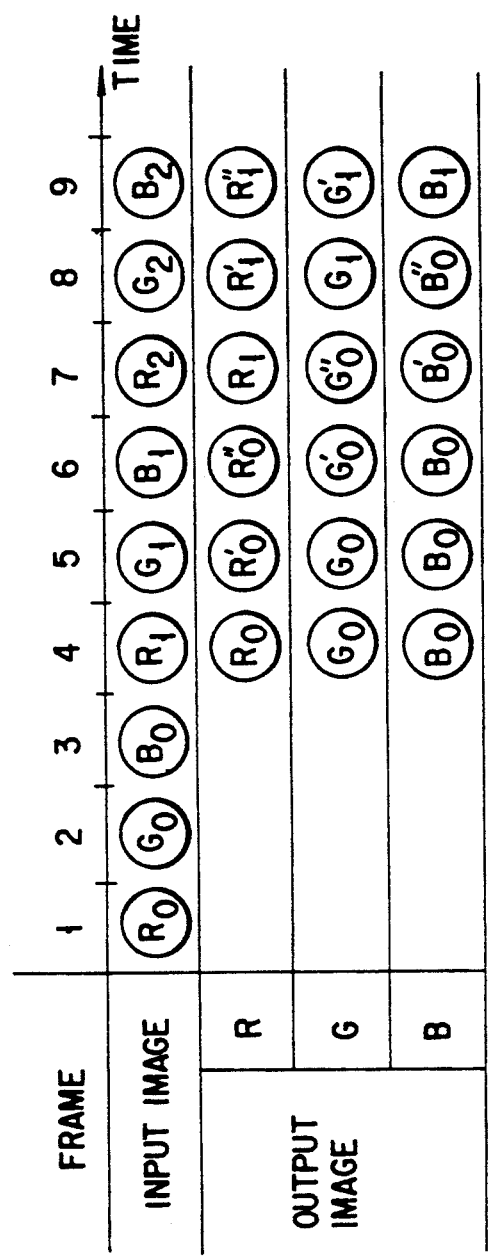
FIG. 14 is a chart showing the relationship between time and input and output images for a non-interlaced image.

FIG. 14 shows the relationship between time and input and output images for a non-interlaced image in this embodiment. An output image is output to be delayed from an input image by one frame. Interpolation equations of R are expressed as the following equations (7) and (8):

$$R_0' = \tfrac{2}{3} R_0 + \tfrac{1}{3} R_1 \tag{7}$$

$$R_0'' = \tfrac{2}{3} R_1 + \tfrac{1}{3} R_0 \tag{8}$$

Similarly, G and B are expressed as follows:

$$G_0' = \tfrac{2}{3} G_0 + \tfrac{1}{3} G_1 \tag{9}$$

$$G_0'' = \tfrac{2}{3} G_1 + \tfrac{1}{3} G_0 \tag{10}$$

$$B_0' = \tfrac{2}{3} B_0 + \tfrac{1}{3} B_1 \tag{11}$$

$$B_0'' = \tfrac{2}{3} B_1 + \tfrac{1}{3} B_0 \tag{12}$$

In general, interpolation equations of R before and after 3n frames (n is an integer) can be expressed as:

$$R_n' = \tfrac{2}{3} R_n + \tfrac{1}{3} R_{n+1} \tag{13}$$

$$R_n'' = \tfrac{2}{3} R_{n+1} + \tfrac{1}{3} R_n \tag{14}$$

Since the same applies to G and B, a detailed description thereof will be omitted.

Figure 13:
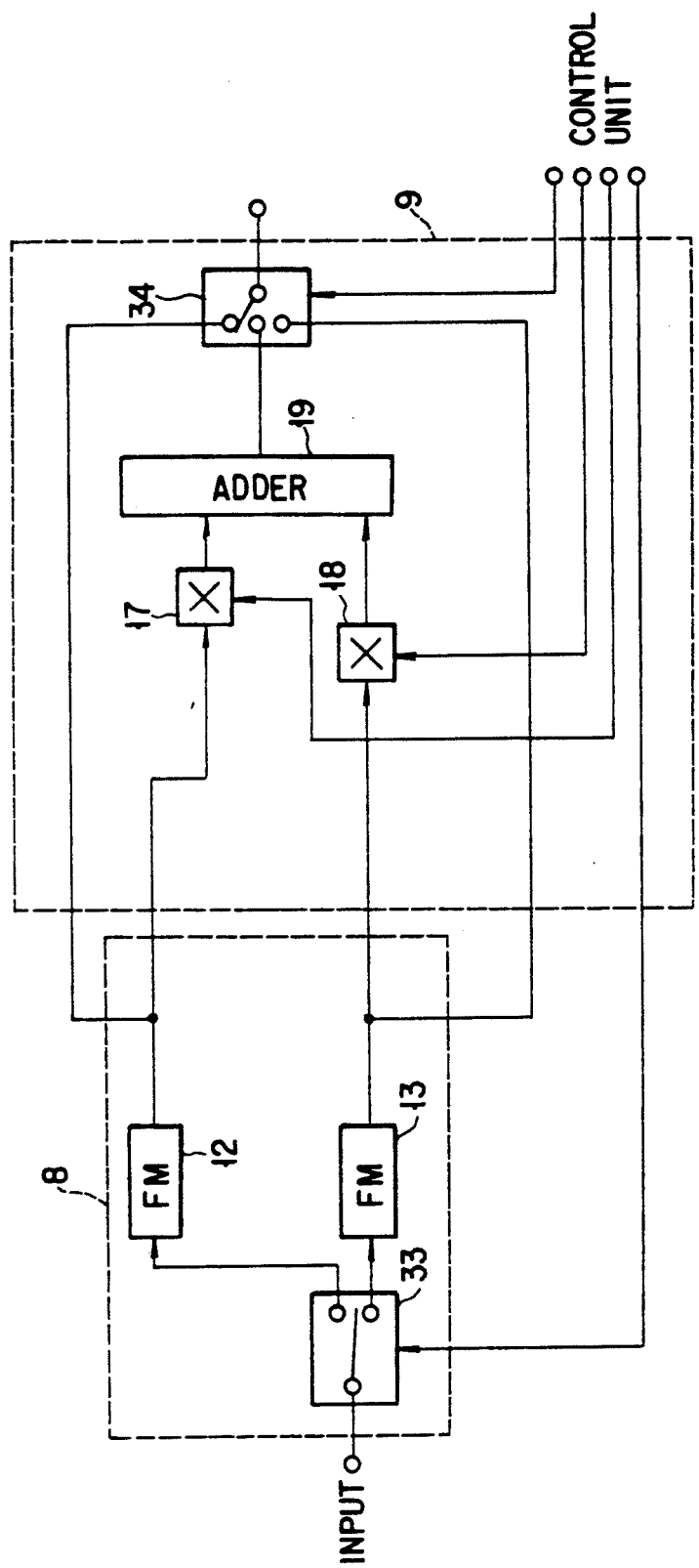
FIG. 13 is a block diagram showing arrangements of a 3DFM and a 3DFL according to the fourth embodiment of the present invention.

The arrangements of a 3DFM 8 and a 3DFL 9 for executing the above-mentioned equations are as shown in FIG. 13. In this embodiment, frame memories are used in place of field memories since a non-interlace system is employed. Therefore, "FM" means a frame memory. The same circuit arrangement shown in FIG. 13 is prepared for each of RGB colors. The operation will be described below with reference to FIG. 14 using R as an example. An R input image is selected by a selector 33, so that an image $R_0$ is input to an FM 12, and an image $R_1$ input three frames later is input to an FM 13. In the fourth frame shown in FIG. 14, the output from the FM 12 is selected by and output from a selector 34. In the fifth and sixth frames, interpolation calculations given by equations (7) and (8) are performed using multipliers 17 and 18 and an adder 19, and the calculation results are selected by and output from the selector 34. In the seventh frame, the output from the FM 13 is selected by and output from the selector 34. In the seventh frame, since an image $R_2$ is input, it is selected by the selector 33, and is recorded on the FM 12.

When the above-mentioned operation is repetitively executed, color misregistrations can be eliminated even with an exposure timing of one color per frame. According to this embodiment, a special imaging device capable of performing a high-speed read operation need not be used, and a commercially available CCD can be used. In FIG. 13, the selectors are used. However, as shown in FIG. 3, FMs may be connected in series with each other.

In each of the above embodiments, a linear interpolation between two signals has been described as a time interpolation. However, the number of data to be used in an interpolation may be increased to improve precision. Alternatively, a spline function may be used to attain an interpolation method having further desirable reproducibility.

When a plurality of colors are exposed and read out during one field period, a decrease in sensitivity may occur due to a short exposure time. However, when an amplifying type imaging device such as a CMD is used, since an amplification effect can be provided in units of pixels, such decrease in sensitivity will not occur. When a field sequential camera is used in a microscope, color misregistrations upon movement of a stage are limited to two-dimensional parallel misregistrations or rotational misregistrations. In this case, another processing for eliminating color misregistrations can be performed.

The fifth embodiment of the present invention for eliminating color misregistrations of the above-mentioned kind will be described below.

Figure 15:
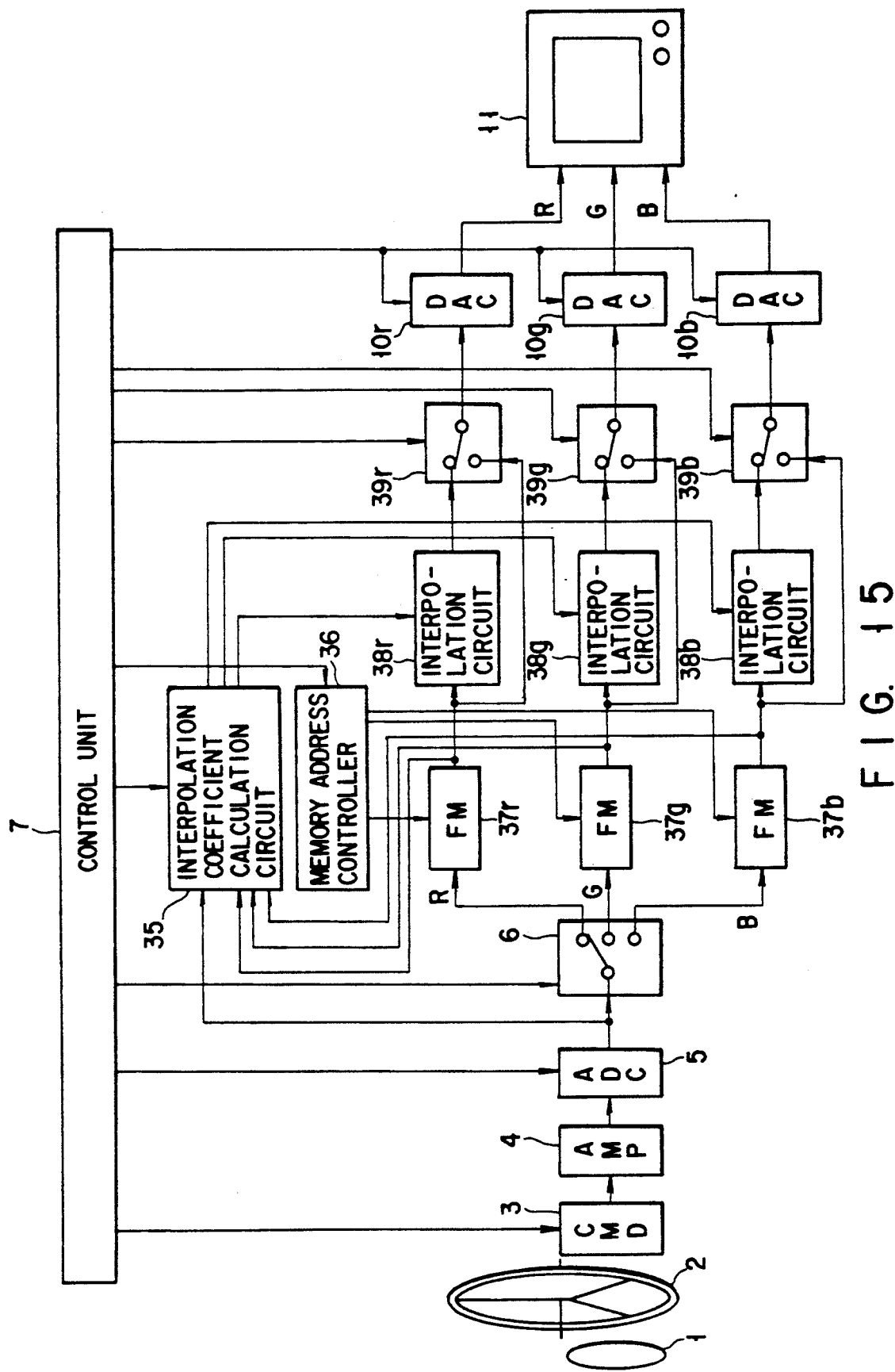
FIG. 15 is a block diagram showing an arrangement according to the fifth embodiment of the present invention.

FIG. 15 is a block diagram showing the overall arrangement according to the fifth embodiment of the present invention. Reference numeral 1 denotes a photographing optical system for photographing object light; and 2, a rotary color filter having R, G, and B filters in the order named. Reference numeral 3 denotes an imaging device which comprises, e.g., CMD solid-state imaging devices, and is driven by a control unit. Reference numeral 4 denotes a preamplifier (AMP) for amplifying outputs from the imaging devices; 5, an ADC for converting the output from the AMP 4 into a digital signal; and 6, a data selector for selecting an input signal. Reference numerals 37r, 37g, and 37b denote frame memories for storing image signals. Reference numerals 38r, 38g, and 38b denote interpolation circuits each for interpolating color images other than an input color image with respect to the input color image. Each interpolation circuit has an arrangement, as shown in FIG. 16.

Figure 16:
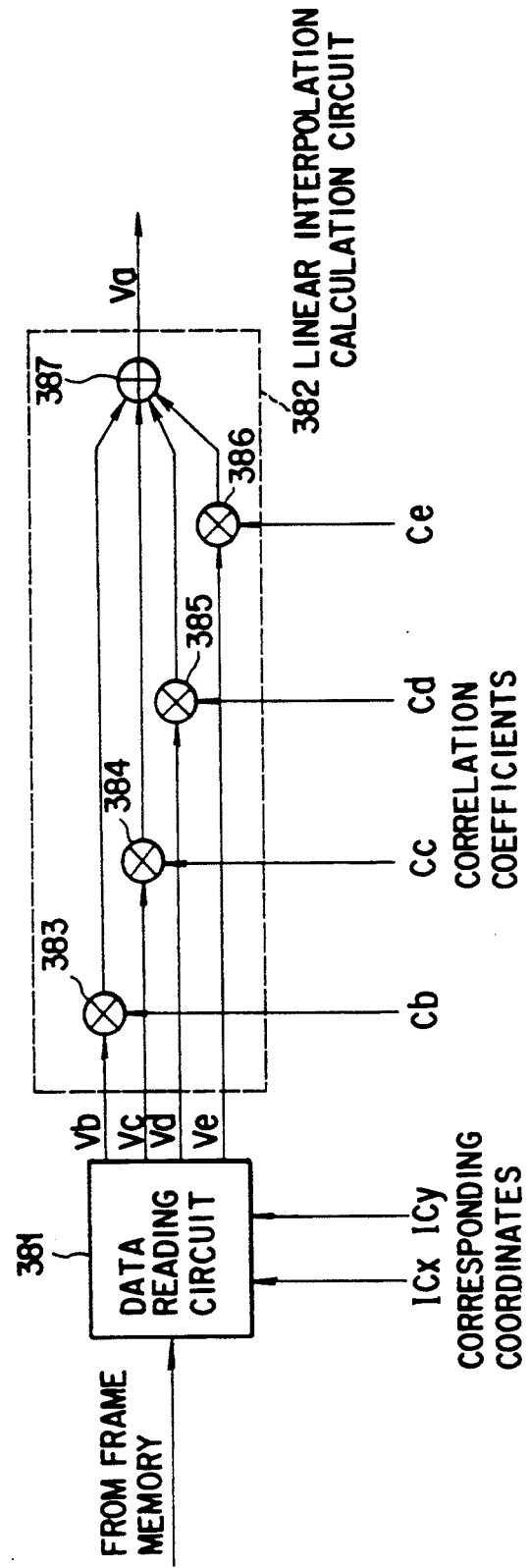
FIG. 16 is a block diagram showing an arrangement of an interpolation circuit shown in FIG. 15.

In FIG. 16, reference numeral 381 denotes a data reading circuit for reading out pixel values $V_b$, $V_c$, $V_d$, and $V_e$ at four positions from the corresponding frame memory 37 according to corresponding coordinates ($IC_x$, $IC_y$) of an image read out from a coefficient memory. Reference numeral 382 denotes a linear interpolation circuit. In this circuit, multipliers 383, 384, 385, and 386 multiply the data $V_b$, $V_c$, $V_d$, and $V_e$ with interpolation coefficients $C_b$, $C_c$, $C_d$, and $C_e$ read out from the coefficient memory, and an adder 387 adds these products. That is, an interpolation calculation is performed by:

$$V_a = C_b V_b + C_c V_c + C_d V_d + C_e V_e \tag{15}$$

The coefficients will be described in detail later. Note that coefficients used in the interpolation are calculated by an interpolation coefficient calculation circuit 35, as will be described later. Each of data selectors 39r, 39g, and 39b switches between an interpolated signal and a non-interpolated signal. In switching control, for example, if an image input from the CMD is an R image, the R image signal is directly output without being interpolated, and G and B signals are interpolated and output. The outputs from the data selectors 39r, 39g, and 39b are respectively converted into analog signals by DACs 10r, 10g, and 10b, and the analog signals are output to a monitor 11. Reference numeral 7 denotes a control unit for controlling the CMD 3, the data selectors 6, 39r, 39g, and 39b, and the like.

Figure 19:
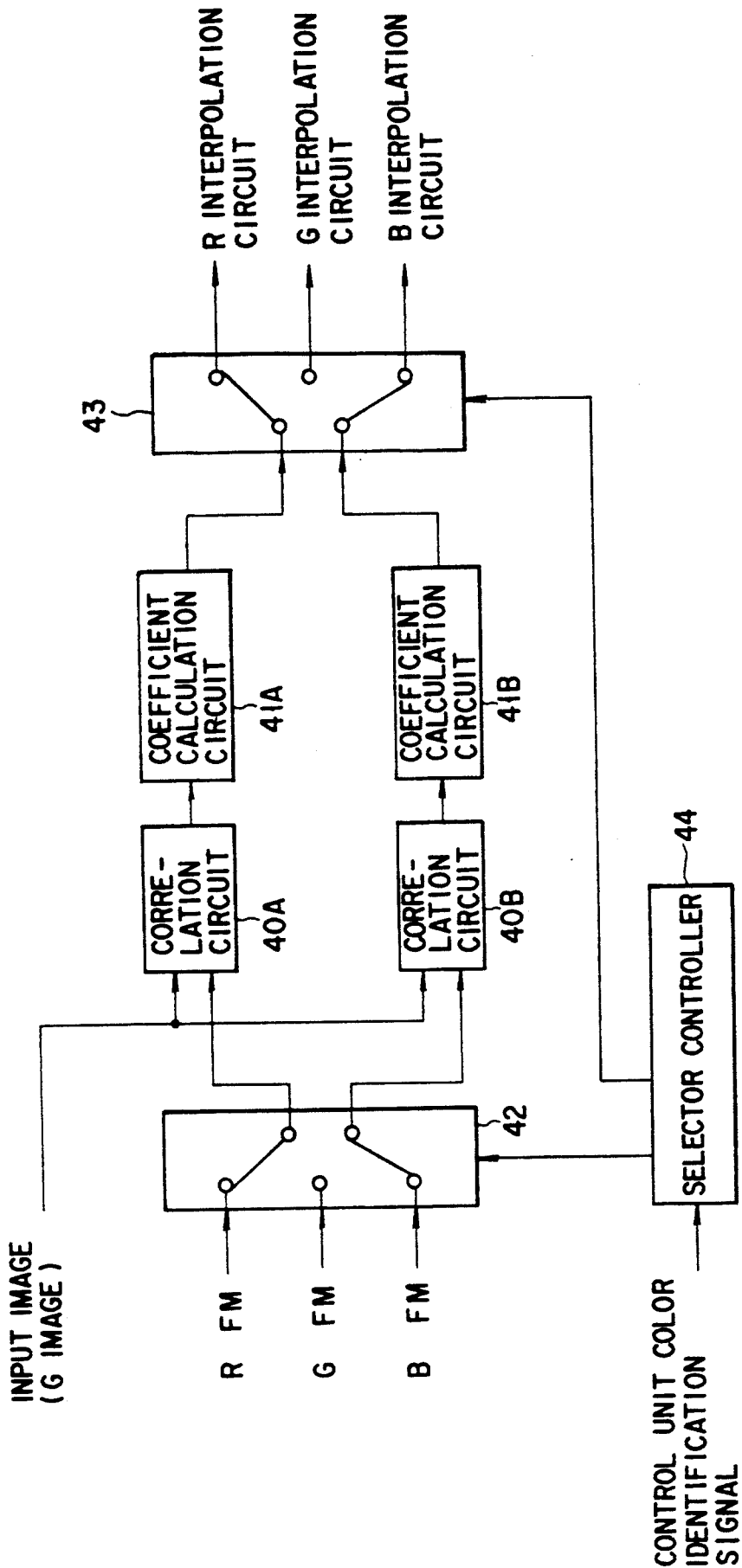
FIG. 19 is a block diagram showing an arrangement of an interpolation coefficient calculation circuit.

The interpolation coefficient calculation circuit 35 will be described below. As shown in FIG. 19, the interpolation coefficient calculation circuit 35 is constituted by correlation circuits 40 (40A and 40B) and coefficient calculation circuits 41 (41A and 41B). Prior to the detailed description of the arrangement, a flow for detecting an interpolation coefficient will be explained below.

Figure 17A:
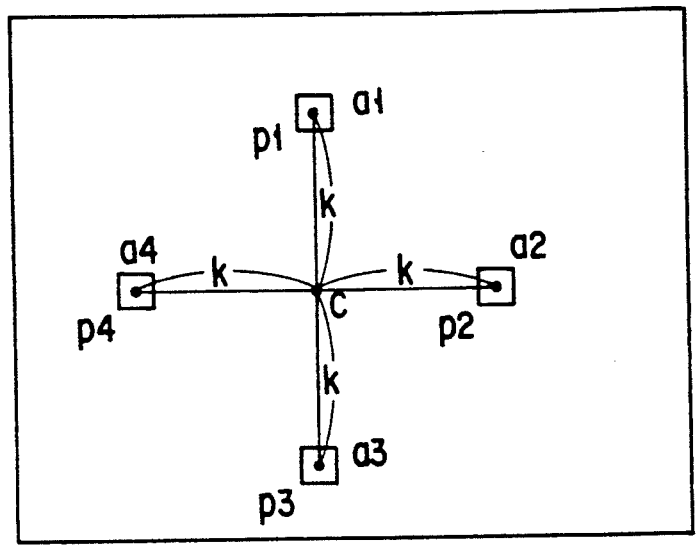
FIGS. 17A and 17B are views for explaining a position shift detection method.
Figure 17B:
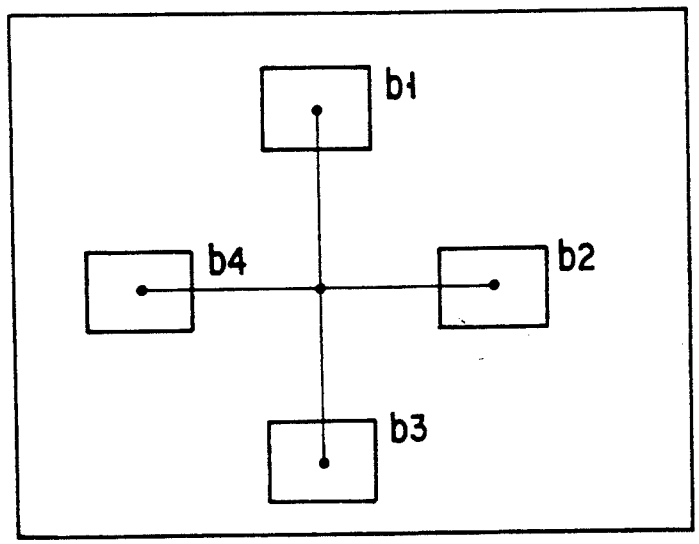

A method of detecting a position shift will be described below. In the following description, a G image is exemplified as an input image. The position shift is separately detected for translation and rotation components at each given position in an image. As shown in FIG. 17A, reference areas a1, a2, a3, and a4 for detecting a position shift are set in the input image (the central positions of these areas are designated by p1, p2, p3, and p4). The areas are present at symmetrical positions about a position c, and each area is separated from the position c by a distance corresponding to k pixels. In an image other than the input image, search areas b1, b2, b3, and b4 for searching positions corresponding to the areas a1, a2, a3, and a4 of the input image are set. Deviation vectors $V_1$, $V_2$, $V_3$, and $V_4$ corresponding to the areas a1, a2, a3, and a4 are detected. The deviation vectors are expressed as follows by a rotation vector r and a translation vector s at the position p1 having the position c as the center (see FIG. 18).

$$V_1 = s + r \tag{16a}$$

$$V_2 = s + r_{-90} \tag{16b}$$

$$V_3 = s - r \tag{16c}$$

$$V_4 = s + r_{+90} \tag{16d}$$

where $r_{-90}$ and $r_{+90}$ are the vectors obtained by rotating r through $-90°$ and $+90°$, respectively. The rotation vector r is expressed by:

$$r = k \tan(\theta) \tag{17}$$

where $\theta$ is the rotational angle. From equations (16a) to (16d), we have:

$$s = (V_1 + V_2 + V_3 + V_4)/4 \tag{18}$$

$$r = (V_1 + V_2 - V_3 - V_4)/4 \tag{19}$$

In this manner, the deviations of translation and rotation can be detected. Note that the rotational angle $\theta$ of the rotation is given by:

$$\theta = \tan^{-1}(r/k) \tag{20}$$

Figure 20:
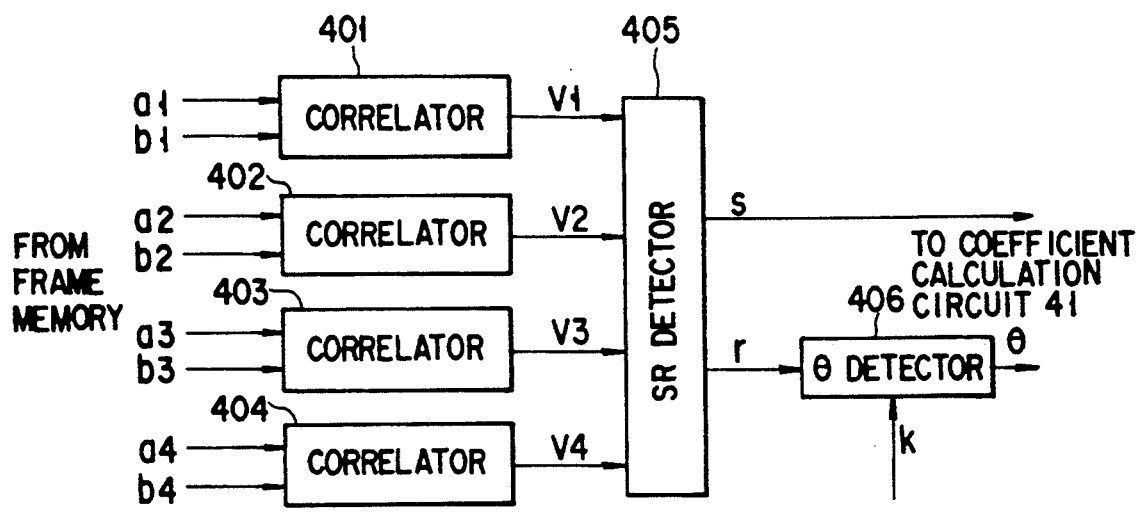
FIG. 20 is a block diagram showing an arrangement of a correlation circuit shown in FIG. 19.

The correlation circuit 40 detects s and $\theta$, and has an arrangement, as shown in FIG. 20. Reference numerals 401, 402, 403, and 404 denote correlators for performing correlation calculations between the reference area a1 and the search area b1, between the reference area a2 and the search area b2, between the reference area a3 and the search area b3, and between the reference area a4 and the search area b4 so as to detect the deviation vectors $v_1$, $v_2$, $v_3$, and $V_4$, respectively. As for the correlation calculation, various methods have been conventionally proposed. In this case, a calculation for comparing sums of the absolute values of differences is performed. Reference numeral 405 denotes an SR detector for detecting the translation vector s and the rotation vector r according to equations (16a) to (16d), (18), and (19). Reference numeral 406 denotes a $\theta$ detector for detecting the rotational angle $\theta$ using equations (17) and (20).

Figure 21:
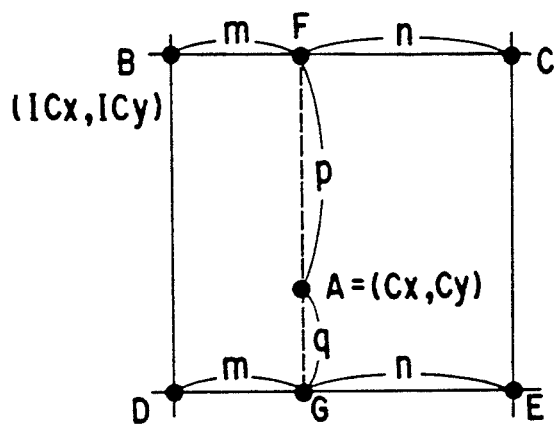
FIG. 21 is a view for explaining an interpolation calculation.

The coefficient calculation circuit 41 for calculating the coefficients $C_b$, $C_c$, $C_d$, and $C_e$ used in interpolation calculations on the basis of r and $\theta$ will be described below. A linear interpolation calculation will be described below with reference to FIG. 21. A case will be examined below wherein the value of a pixel A is obtained from pixels B, C, D, and E whose values are already known, as shown in FIG. 21. If intersections between a line passing the pixel A and extending perpendicularly to line segments BC and DE, and the line segments BC and DE are respectively represented by F and G, and BF : FC = DG : GE = m : n, and FA : AG = p : q, a value $V_f$ of a pixel F is given by:

$$V_f = (nV_b + mV_c)/(m+n) \tag{21}$$

A pixel value $V_g$ of a pixel G is given by:

$$V_g = (nV_d + mV_e)/(m+n) \tag{22}$$

Therefore, the value $V_a$ is given by:

$$V_a = (qV_f + pV_g)/(p+q) \tag{23}$$

Since $m+n=p+q=1$ for an inter-pixel distance=1, $V_a$ can be calculated by:

$$\begin{aligned}V_a &= q(nV_b + mV_c) + p(nV_d + mV_e) \\ &= (1-p)(1-m)V_b + (1-p)mV_c + p(1-m)V_d + \\ &\quad pmV_e\end{aligned} \tag{24}$$

Upon comparison with equation (1), the interpolation coefficients are respectively given by:

$$C_b = (1-p)(1-m) \quad C_c = (1-p)m$$

$$C_d = p(1-m) \quad C_e = pm \tag{25}$$

If the coordinates of the pixel A are represented by ($C_x$, $C_y$), the coordinates of the pixels B, C, D, and E are respectively expressed by:

Pixel B = ($IC_x$, $IC_y$)

Pixel C = ($IC_{x+1}$, $IC_y$)

Pixel D = ($IC_x$, $IC_{y+1}$)

Pixel E = ($IC_{x+1}$, $IC_{y+1}$) (26)

where $IC_x$ is the integral part of $C_x$, and $IC_y$ is the integral part of $C_y$.

Positions $X_r$ and $X_b$ on images other than an input image (R and B images in this case) corresponding to a position $X_g$ of the input image (G image in this case) are respectively given by:

$$X_r = R(\theta_r)(X_g + S_r) \tag{27}$$

$$X_b = R(\theta_b)(X_g + S_b) \tag{28}$$

where $S_r$, $S_b$, $\theta_r$, and $\theta_b$ are respectively the translation vectors and the rotational angles of the R and B images, and $X_r$, $X_g$, and $X_b$ are the two-dimensional vectors having the x- and y-coordinates as elements. In addition, $R(\theta)$ is given by:

$$R(\theta) = \begin{pmatrix} \cos\theta & -\sin\theta \\ \sin\theta & \cos\theta \end{pmatrix} \tag{29}$$

Figure 22:
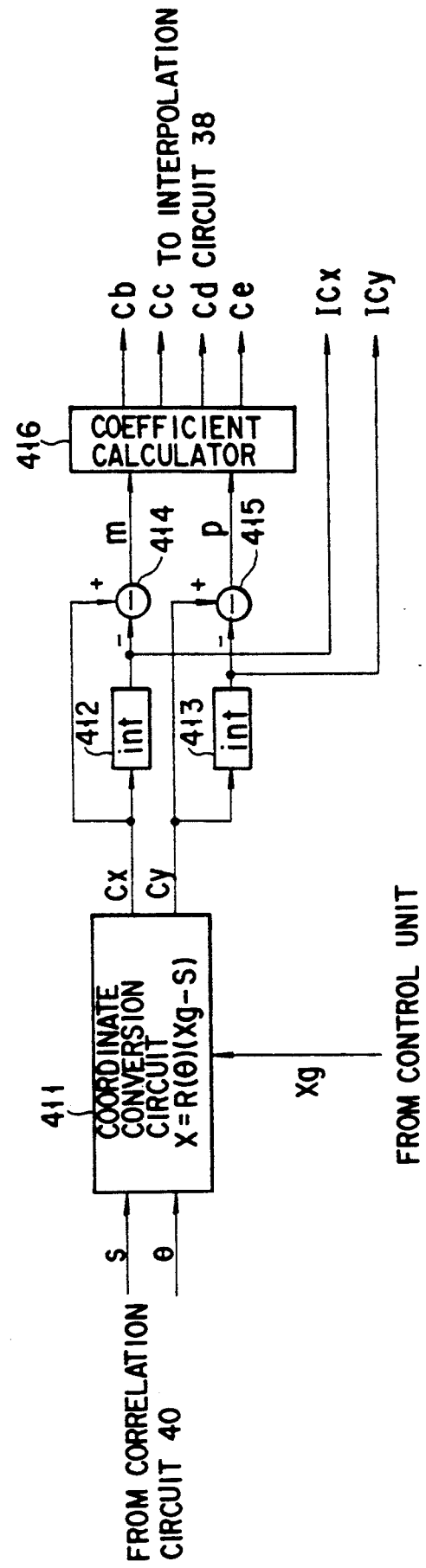
FIG. 22 is a block diagram showing an arrangement of a coefficient calculation circuit.

FIG. 22 shows the arrangement of the coefficient calculation circuit 41. In FIG. 22, reference numeral 411 denotes a coordinate conversion circuit for calculating equations (27) and (28), and outputting corresponding coordinates $C_x$ and $C_y$ of the R and B images. Note that $C_x$ and $C_y$ are real numbers. Reference numerals 412 and 413 denote integer converters for outputting the coordinates $IC_x$ and $IC_y$ in FIG. 21. Reference numerals 414 and 415 denote subtracters for respectively outputting m ($=C_x - IC_x$) and p ($=C_y - IC_y$). Reference numeral 416 denotes a coefficient calculator for calculating the interpolation coefficients on the basis of equation (25), and outputting the interpolation coefficients $C_b$, $C_c$, $C_d$, and $C_e$.

The operation of the present invention with the above arrangement will be described below. In the following description, a G image is exemplified as an input image.

When a photographing operation is started, focusing adjustment of the photographing optical system 1 and adjustment of the exposure time of the imaging device 3 are performed by a distance measurement system and a photometric system (neither are shown). Object light is transmitted through the rotary color filter 2 in an RGB sequential manner, and is converted into an image signal by the imaging device 3. The image signal is amplified by the AMP 4 to keep white balance, and the amplified signal is then converted into a digital signal by the ADC 5.

Figure 23A:
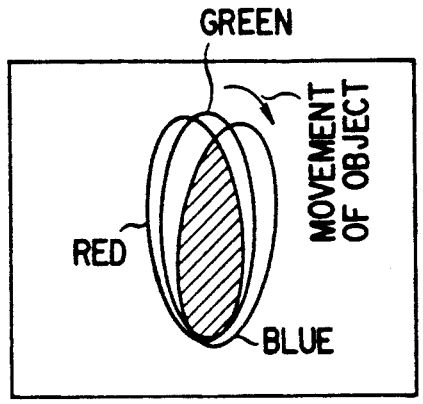
FIGS. 23A and 23B are views for explaining an operation of the fifth embodiment.
Figure 23B:
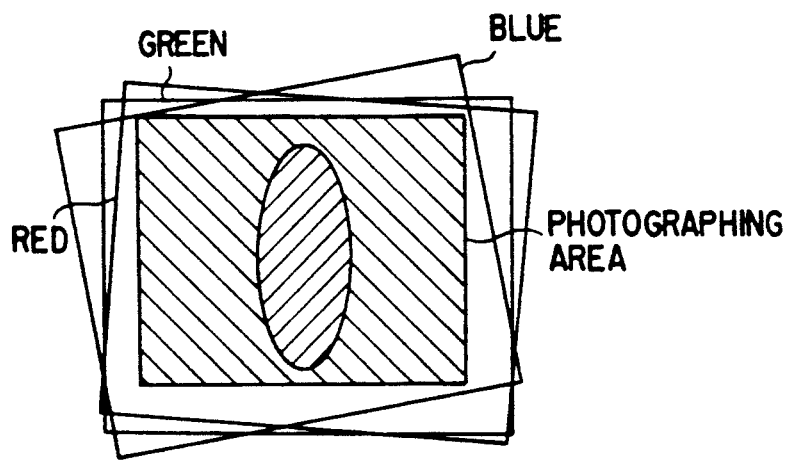

The digital signal is selected by the data selector 6, and is stored in the FM 37g. Simultaneously with this storage operation, the correlation circuit 40A receives reference areas a1, a2, a3, and a4 of a G image, and search areas b1, b2, b3, and b4 are read out from the frame memory 37r (R image), thereby detecting a translation vector $S_r$ and a rotational angle $\theta_r$ between the G and R images. $S_r$ and $\theta_r$ are supplied to the coefficient calculation circuit 41A, thereby calculating the corresponding coordinates $IC_x$ and $IC_y$ of the R image corresponding to the coordinate $X_g$ of the G image and the interpolation coefficients $C_b$, $C_c$, $C_d$, and $C_e$. Then, $IC_x$ and $IC_y$, and $C_b$, $C_c$, $C_d$, and $C_e$ are detected for a predetermined range of the G image, and are output to the interpolation circuit 38r. The predetermined range means an overlapping range (photographing area) of R, G, and B images, as shown in FIG. 23B. The photographing area is pre-set by predicting the moving range of an object.

Similarly, in the interpolation coefficient calculation circuit 35, the position shift amounts of the G and B images are detected by the correlation circuit 40B and the coefficient calculation circuit 41A, and the corresponding coordinates $IC_x$ and $IC_y$ of the B image in the photographing area and the interpolation coefficients $C_b$, $C_c$, $C_d$, and $C_e$ are calculated. These data are output to the corresponding interpolation circuit. Thereafter, R image data used in the interpolation calculation is read out from the frame memory 37r, and the interpolation calculation is performed by the interpolation circuit 38r, thereby calculating the pixel value of the R image corresponding to the designated G image position. Similarly, the pixel value of the B image corresponding to the designated G image position is calculated. These pixel values are output to the corresponding DACs 10r, 10g, and 10b. The pixel values are converted into analog signals, and the analog signals are displayed. As described above, the interpolation coefficients for the photographing area where R, G, and B image overlap each other are calculated.

In the above description, a G image is exemplified as an input image. When an R image is an input image, G and B images can be interpolated; when a B image is an input image, R and G images can be interpolated. The inputs to the correlation circuits are switched by a data selector 42, as shown in FIG. 19, and the data selector 42 is controlled by a selector controller 44. The outputs are switched by a data selector 43.

In this embodiment, the two interpolation coefficient calculation circuits are used to calculate the coefficients for correction. Alternatively, only one interpolation coefficient calculation circuit may be used, and images may be switched. In this embodiment, the four areas a1, a2, a3, and a4 are selected as the reference areas, as shown in FIG. 17A. Alternatively, only two areas, i.e., a1 and a3, or a2 and a4 may be selected, or five or more areas may be selected. The interpolation circuit 38 uses a linear interpolation calculation. However, the present invention is not limited to this. For example, a high-order correlation calculation such as a spline interpolation, an SINC interpolation, or the like may be used.

The sixth embodiment of the present invention will be described below.

Figure 27:
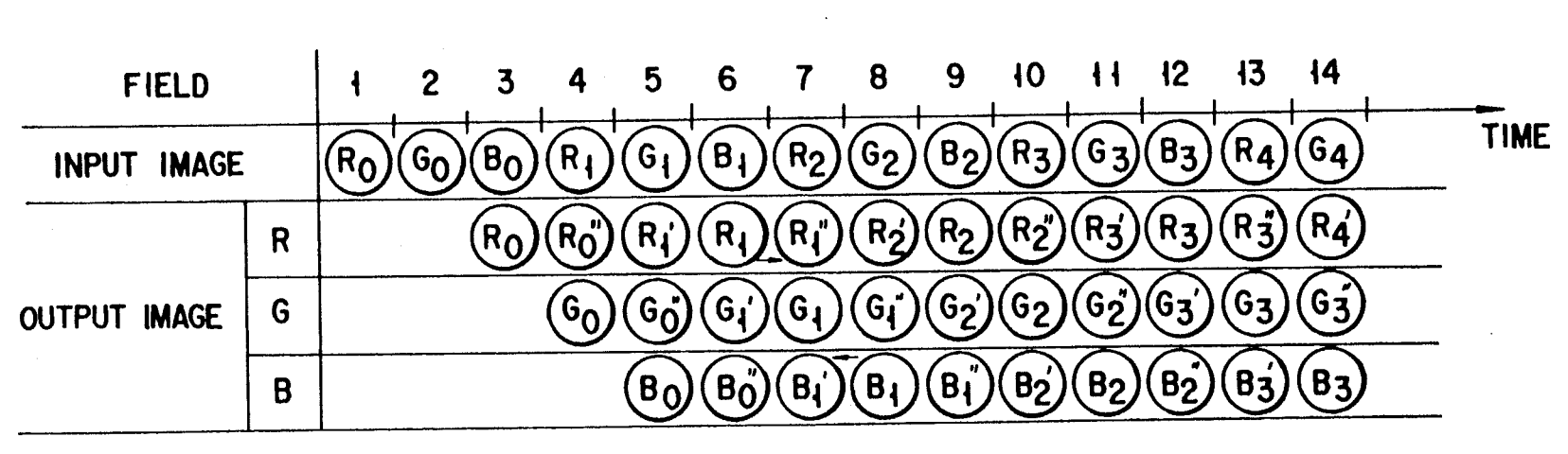

In this embodiment, interpolation coefficients are calculated based on information stored in a frame memory. In order to obtain a B image at the position of $G_1$ in the sixth field in FIG. 28, the positional relationship between $B_0$ two frames before and $G_1$ must be calculated. This operation may undesirably decrease a photographing area shown in FIG. 23A for an object which moves quickly. In this embodiment, a B image at the position of $G_1$ is interpolated from $B_1$ (see the seventh frame in FIG. 27) unlike in the above embodiment. In the following description, a $G_1$ image shown in the seventh frame in FIG. 27 is exemplified as an input image.

Figure 24:
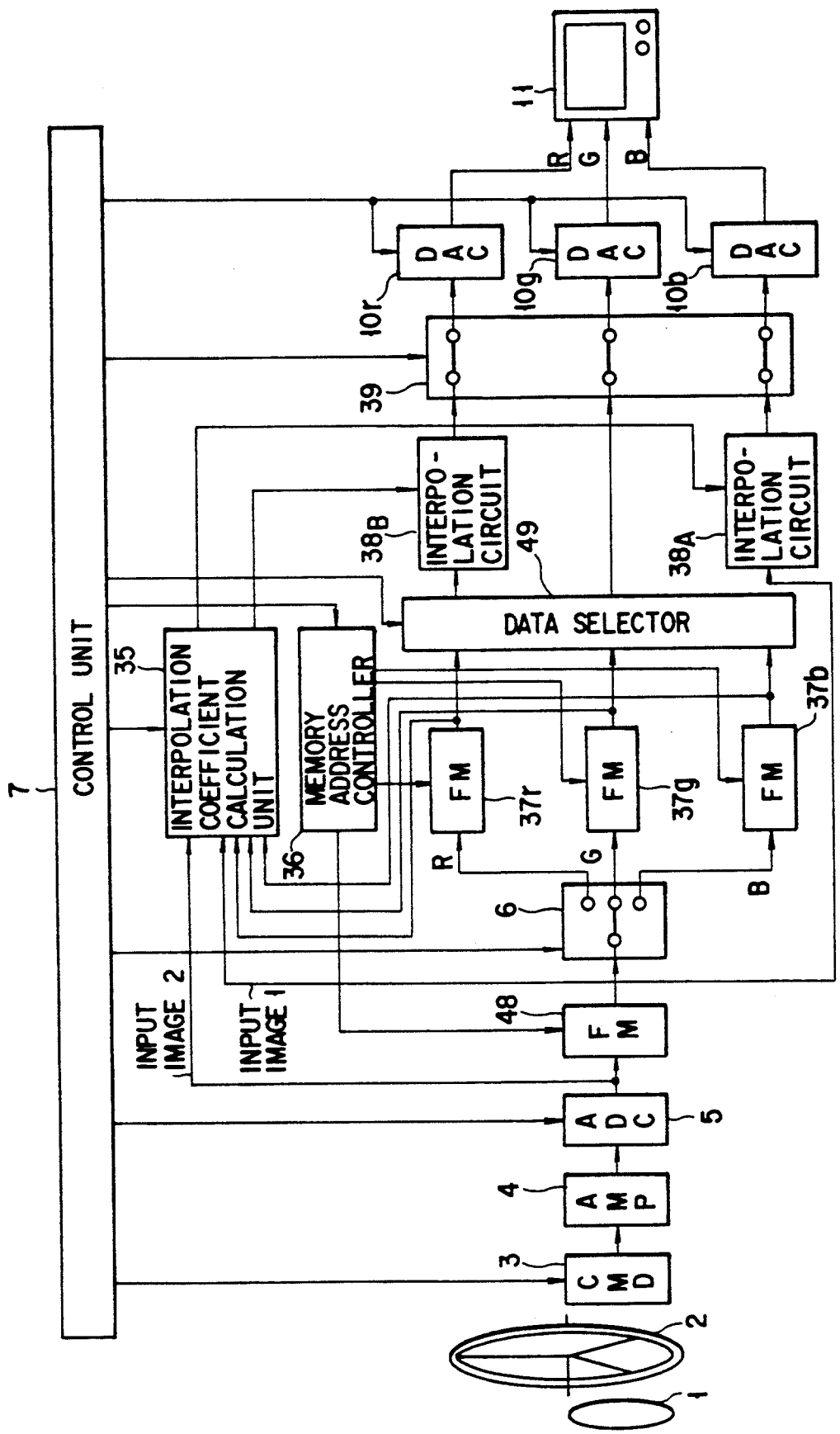
FIG. 24 is a block diagram showing an arrangement according to the sixth embodiment of the present invention.

FIG. 24 is a block diagram showing the arrangement of this embodiment. A description of the same arrangement as in the fifth embodiment will be omitted.

Assume that a $G_1$ image is stored in a frame memory (to be abbreviated to as an FM hereinafter) 48. The correlation between the $G_1$ image and a $B_1$ image output from an ADC 5 is calculated by a correlation circuit 40A shown in FIG. 26. At the same time, an $R_1$ image is read out from an FM 37r, and a correlation circuit 40B calculates the correlation between the $B_1$ and $G_1$ image. Furthermore, at the same time, the $G_1$ image is written in an FM 37g. With the above-mentioned operations, the FM 48 stores the $B_1$ image, the FM 37r stores the $R_1$ image, the FM 37g stores the $G_1$ image, and an FM 37b stores a $B_0$ image. Thereafter, the output from the FM 37r is input to a DAC 10r through an interpolation circuit 38B, the output from the FM 37g is directly input to a DAC 10g, and the output from the FM 48 is input to a DAC 10b through an interpolation circuit 38A. The output images are those shown in the seventh frame in FIG. 27. Data selectors 49 and 39 select images to be supplied to the interpolation circuits in correspondence with sequentially input color images.

With the above-mentioned operations, a position interpolation can be realized by images at adjacent time positions.

According to this embodiment, when 1/30 sec are required to fetch an R image, and 1/10 sec are required to fetch all the colors, since R, G, and B color images are obtained at 1/30-sec intervals while being position-interpolated, images with less color misregistrations can be obtained. In the fifth embodiment, the interpolation circuits are arranged for all the R, G, and B colors. However, as in the sixth embodiment, when the data selectors are inserted at the input and output sides of the interpolation circuits, one interpolation circuit can be omitted. In addition, like in the first embodiment, for example, R and B images may be corrected with reference to a G image by performing a high-speed photographing operation. In this case, an interpolation circuit for the G image can be omitted.

The seventh embodiment of the present invention will be described below. An application for a case wherein a portion of an object moves will be described below. For example, in a microscope, when a stage is moved, color misregistrations are corrected by a position interpolation, and when a portion of an object moves, color misregistrations are corrected by a time interpolation. Means for discriminating movement of the stage and movement of the object will be described below.

Figure 25:
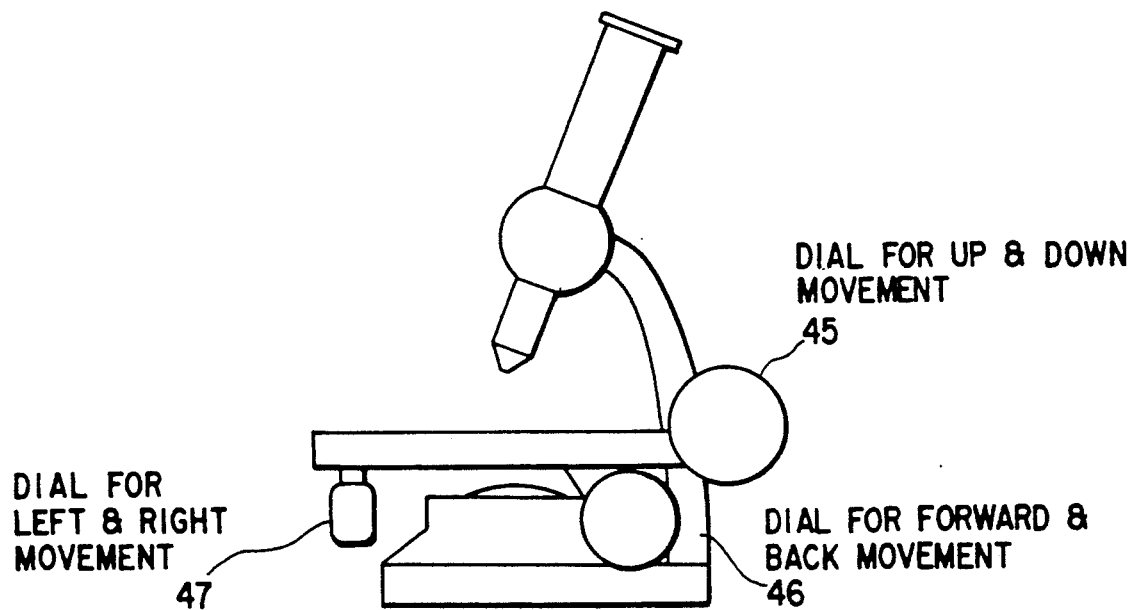
FIG. 25 is a schematic view showing an arrangement of a microscope according to the seventh embodiment of the present invention.

As shown in FIG. 25, switches are provided to dials 46 and 47 for moving the stage. When one of these dials is operated, the position interpolation is performed. As for color misregistrations caused by other factors, the time interpolation is performed.

Figure 18:
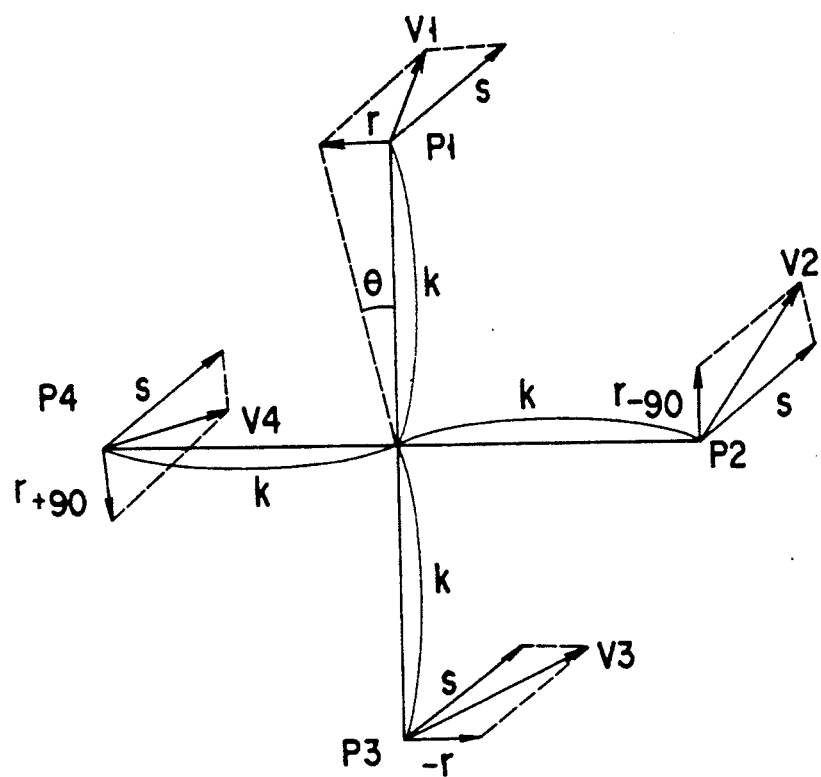
FIG. 18 is a view showing deviation vectors.

As another embodiment, the movement is predicted from a pattern of deviation vectors corresponding to the four search areas shown in FIG. 18. When only the stage is moved, the deviation vectors can be expressed by the translation vector s and the rotation vector r, as indicated by equations (16a) to (16d). However, when a portion of an object moves, the motion vector of the object is added to one of these deviation vectors. More specifically, a deviation vector V cannot be expressed as equations (18) and (19). Thus, for the purpose of discrimination, the following evaluation value $\epsilon$ is defined:

$$\epsilon = |V_1 - (s+r)| + |V_2 - (s+r_{-90})|$$
$$+ |V_3 - (s-r)| + |V_4 - (s+r_{+90})| \quad (30)$$

When a portion of the object moves, $\epsilon$ is increased. Thus, when $\epsilon$ is larger than a threshold value $\epsilon_T$, the time interpolation is performed; otherwise, the position interpolation is performed.

The eighth embodiment of the present invention will be described below. The above-mentioned position interpolation is a correction method used when the entire object moves in a uniform direction like in a case wherein the stage is moved. The embodiment which uses the time interpolation when a portion of an object moves has been proposed. However, discrimination of movement of the stage or movement of a portion of an object requires cumbersome operations. Thus, an embodiment for correcting color misregistrations by the position interpolation even when a portion of an object moves will be described below.

Figure 30:
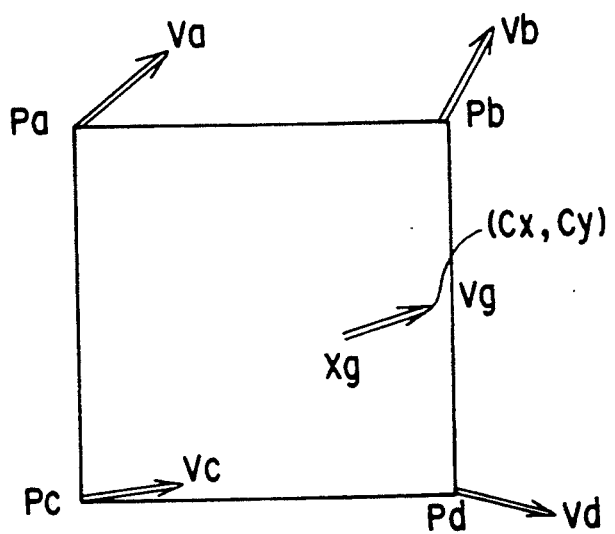
FIG. 30 is a view showing motion vectors.

In this embodiment, motion vectors at a large number of positions in an image are obtained, and a motion vector at a position where no motion vector is obtained initially is obtained by interpolating the already obtained motion vectors. As shown in FIG. 29, e.g., m×n reference areas are selected from an input image. The central coordinates of these areas are represented by $P_{11}, P_{21}, \ldots, P_{mn}$. Then, a case will be examined below wherein corresponding coordinates in R and B images at a position $x_g$ of a G image are calculated when the G image is an input image. A motion vector $V_g$ at the position $x_g$ is calculated from motion vectors $V_a, V_b, V_c,$ and $V_d$ obtained from reference areas closest to the coordinate position $x_g$, as shown in FIG. 30. $V_g$ can be calculated by the following equation as in the above-mentioned coordinate interpolation:

$$V_g = C_{va}V_a + C_{vb}V_b + C_{vc}V_c + C_{vd}V_d \quad (31)$$

Since the method of calculating $C_{va}, C_{vb}, C_{vc},$ and $C_{vd}$ are the same as that as described above, a detailed description thereof will be omitted. A coordinate position $x_r$ corresponding to $x_g$ can be calculated by:

$$x_r = x_g + V_g \quad (32)$$

Figure 31:
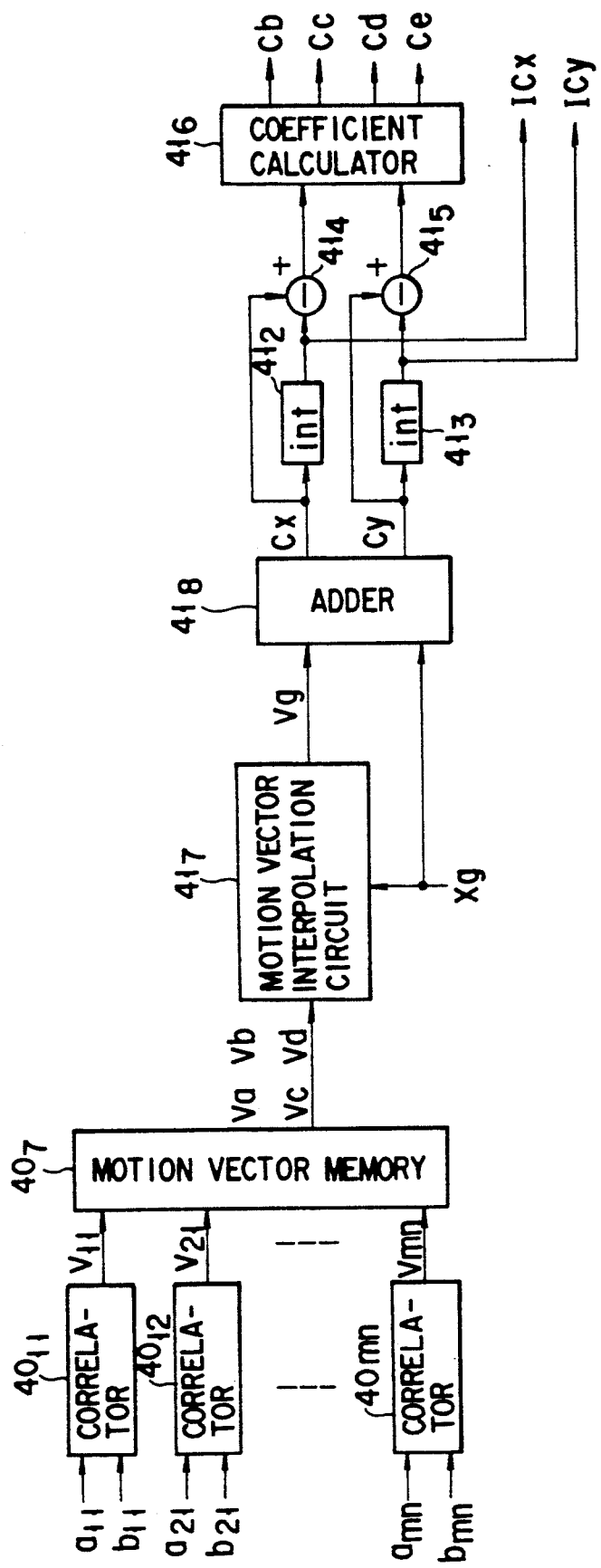
FIG. 31 is a block diagram showing arrangements of a correlation circuit and a coefficient calculation circuit of the eighth embodiment.

The arrangement of this embodiment is common to those of the fifth and sixth embodiments, except for a portion of an interpolation coefficient calculation circuit. That is, a correlation circuit 40 and a coefficient calculation circuit 41 in an interpolation coefficient calculation circuit 352 have arrangements shown in FIG. 31. Reference numerals $40_{11}$, $40_{21}$, ... $40_{mn}$ denote correlators for performing correlation calculations between reference areas $a_{11}$, $a_{21}$, ... $a_{mn}$, and corresponding search areas $b_{11}$, $b_{21}$, ... $b_{mn}$, and outputting motion vectors $V_{11}$, $V_{21}$ = ... = $V_{mn}$. When only the stage is moved, $V_{11} = V_{21}$ = ... = $V_{mn}$. However, when a portion of an object moves, or when an object expands or contracts, the motion vectors are different from each other. The motion vectors $V_{11}$, $V_{21}$, ... $V_{mn}$ are stored in a motion vector memory $40_7$, and are used for interpolating a motion vector. Reference numeral $41_7$ denotes a motion vector interpolation circuit for calculating the motion vector $V_g$ corresponding to the position $x_g$ of an input image according to equation (31). Reference numeral $41_8$ denotes an adder for calculating equation (32), and outputting corresponding coordinates $(C_x, C_y)$.

The subsequent circuit outputs interpolation coefficients $C_b$, $C_c$, $C_d$, and $C_e$ used in interpolation circuits 38r, 38g, and 38b, and addresses $IC_x$ and $IC_y$ of data to be read out like in the fifth and sixth embodiments.

As described above, according to this embodiment, since the motion vectors at respective positions of an input image are calculated, even when a portion of an object moves, color misregistrations can be corrected by the position interpolation. Of course, when the stage is moved, color misregistrations can be similarly corrected.

As described in detail above, in each of the embodiments of the field sequential imaging apparatus according to the present invention, a position shift between successive ones of sequentially picked-up image signals in units of colors is detected, and the position shift of the image signal is corrected according to the detected position shift, thereby attaining easy and satisfactory color-misregistration correction with high precision.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A field sequential imaging apparatus comprising:
    imaging means for imaging an object in units of colors by sequentially switching a plurality of color filters so as to obtain image signals relating to the respective color sequentially at different points of time;
    storage means for storing the image signals from said imaging means at the different points of time;
    correction means for generating image signals of colors other than an image signal of a particular color obtained by said imaging means at a particular imaging point of time by time-interpolating the image signals of the other colors at the particular point of time, based on image signals of at least two points of time other than said particular time, and of colors other than the image signal at the particular imaging point of time; and
    synthesizing means for synthesizing the image signal of the particular color at the particular imaging point of time obtained by the imaging means, and the image signals of the other colors produced by the time-interpolation by said correction means.

2. An apparatus according to claim 1, wherein said imaging means includes a photoelectric conversion device which performs a high-speed read operation.

3. An apparatus according to claim 1, wherein said plurality of color filters are rotation filters having three colors of R, G, and B, and said correction means includes three-dimensional filtering means for time-interpolating other color images based on a time position of a specific one of R, G, and B color images.

4. An apparatus according to claim 3, wherein said storage means includes an image memory, and said three-dimensionsal filtering means includes adder means for adding a first image signal from said image memory and a 1H-delayed image signal, first multiplier means for multiplying a sum from the adder means with a predetermined coefficient, second multiplier means for multiplying a second image signal from said image memory with another predetermined coefficient, and another adder means for adding outputs from said first and second multiplier means.

5. An apparatus according to claim 3, wherein said three-dimensional filtering means includes three three-dimensional filtering means in correspondence with colors so as to time-interpolate color images to be output at the same time as a color image picked up at a certain time, by images of the same colors of preceding and following time points.

6. An apparatus according to claim 1, wherein said plurality of color filters have an exposing portion for exposing light reflected from the object, and a light-shielding portion for shielding the reflected light, and said apparatus further includes noise reduction means for reducing noise on the basis of a signal from the light-shielding portion.

7. An apparatus according to claim 6, wherein said noise reduction means includes storage means for storing the noise, and subtracter means for subtracting the noise stored in said storage means from an output of said correction means.

8. An apparatus according to claim 1, wherein said correction means includes storage means for storing the image signal from said imaging means at a timing of one color per field, first multiplier means for multiplying a first image signal from said storage means with a predetermined coefficient, second multiplier means for multiplying a second image signal from said storage means with another predetermined coefficient, adder means for adding outputs from said first and second multiplier means, and selection means for selecting one of the first image signal, the second image signal, and an output from said adder means.

9. An apparatus according to claim 1, further comprising:
    interpolation coefficient calculating means for calculating an interpolation coefficient based on a position gap between an image picked up by a particular color and an image picked up by another color.

10. An apparatus according to claim 9, wherein said interpolation coefficient calculation means includes a correlation calculator for detecting deviations of an image at a plurality of pixel positions near a central position thereof, and a position shift information detector for detecting position shaft information including a rotational amount and a translation amount on the basis of the detected deviations.

11. An apparatus according to claim 9, further including coefficient calculation means for calculating an interpolation coefficient and address data for detecting an image signal value of a target image corresponding to an arbitrary position of a specific image on the basis of position shift information between the specific image and the target image.

12. An apparatus according to claim 9, wherein said interpolation coefficient calculating means includes means for calculating an interpolation coefficient from interpolating motion vectors obtained at a plurality of positions in an image.

13. An apparatus according to claim 9, wherein said synthesizing means includes means for selecting an output from one of said correction means and said interpolation coefficient calculating means in accordance with a moving state of an object, for synthesizing said image signals.

* * * * *